US012496022B2

(12) United States Patent
Horiuchi et al.

(10) Patent No.: US 12,496,022 B2
(45) Date of Patent: Dec. 16, 2025

(54) IMAGING SUPPORT APPARATUS, OPERATION METHOD OF IMAGING SUPPORT APPARATUS, AND OPERATION PROGRAM OF IMAGING SUPPORT APPARATUS

(71) Applicant: FUJIFILM CORPORATION, Tokyo (JP)

(72) Inventors: Hisatsugu Horiuchi, Tokyo (JP); Koji Taninai, Tokyo (JP); Masataka Sugahara, Tokyo (JP); Kazuyuki Ogi, Tokyo (JP); Atsushi Onoda, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 338 days.

(21) Appl. No.: 18/173,786

(22) Filed: Feb. 24, 2023

(65) Prior Publication Data
US 2023/0293124 A1    Sep. 21, 2023

(30) Foreign Application Priority Data

Mar. 18, 2022    (JP) ................................ 2022-044571

(51) Int. Cl.
*A61B 6/04* (2006.01)
*A61B 6/00* (2024.01)
*A61B 6/46* (2024.01)

(52) U.S. Cl.
CPC ............ *A61B 6/0492* (2013.01); *A61B 6/461* (2013.01); *A61B 6/488* (2013.01); *A61B 6/4429* (2013.01); *A61B 6/4464* (2013.01); *A61B 6/4476* (2013.01); *A61B 6/54* (2013.01); *A61B 6/548* (2013.01)

(58) Field of Classification Search
CPC ....... A61B 6/0492; A61B 6/461; A61B 6/488; A61B 6/4429; A61B 6/4464; A61B 6/4476; A61B 6/54; A61B 6/548; A61B 6/0407; A61B 6/4452
See application file for complete search history.

(56) References Cited

U.S. PATENT DOCUMENTS

| 11,020,068 | B2* | 6/2021 | Imamura | ................ | A61B 6/463 |
| 11,166,694 | B2* | 11/2021 | Takagi | .................... | A61B 6/587 |
| 2014/0348292 | A1* | 11/2014 | Yabugami | .............. | A61B 6/488 |
| | | | | | 378/42 |
| 2018/0314891 | A1* | 11/2018 | Ota | ........................ | G16H 40/63 |
| 2018/0369611 | A1* | 12/2018 | Owens | ................. | A61N 5/1068 |

(Continued)

FOREIGN PATENT DOCUMENTS

JP    2011-177326 A    9/2011

*Primary Examiner* — David P Porta
*Assistant Examiner* — Gisselle M Gutierrez
(74) *Attorney, Agent, or Firm* — SOLARIS Intellectual Property Group, PLLC

(57) ABSTRACT

A CPU of a console includes a status recognition unit and a projector controller. The status recognition unit acquires subject position information, an adjustment end signal, and an irradiation end signal, which are progress status information indicating a progress status of radiography. The projector controller performs control of causing a projector to project guide information which is related to imaging aimed at a subject, the guide information corresponding to the progress status information, onto a preset projection surface of a radiography room.

8 Claims, 29 Drawing Sheets

(56) References Cited

U.S. PATENT DOCUMENTS

| | | | |
|---|---|---|---|
| 2020/0352532 A1* | 11/2020 | Uehara | A61B 6/4476 |
| 2022/0022824 A1* | 1/2022 | Sugahara | A61B 6/04 |
| 2023/0218245 A1* | 7/2023 | Horiuchi | A61B 6/461 |
| | | | 378/63 |
| 2023/0225686 A1* | 7/2023 | Horiuchi | A61B 6/4452 |
| | | | 378/198 |
| 2023/0270334 A1* | 8/2023 | Horiuchi | A61B 5/1079 |
| | | | 600/476 |
| 2023/0293134 A1* | 9/2023 | Horiuchi | G16H 30/20 |
| | | | 378/62 |
| 2024/0081765 A1* | 3/2024 | Kitano | A61B 6/544 |
| 2024/0415476 A1* | 12/2024 | Sugahara | A61B 6/461 |

\* cited by examiner

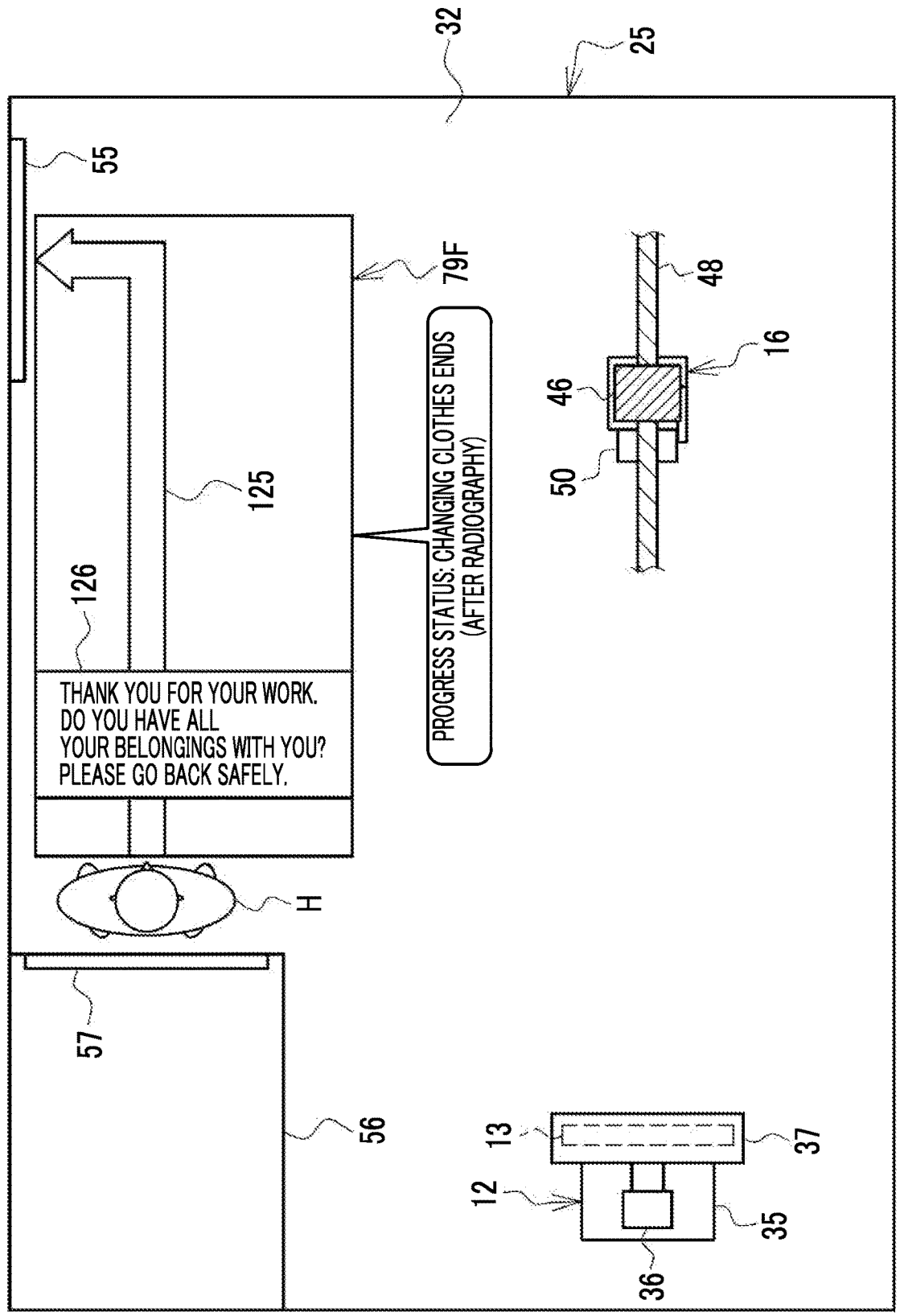

| PROGRESS STATUS | GUIDE INFORMATION | | PROJECTION SURFACE | PROJECTOR |
|---|---|---|---|---|
| ENTERING RADIOGRAPHY ROOM | ARROW INDICATING MOVEMENT ROUTE TO CHANGING ROOM MESSAGE TO URGE CHANGING CLOTHES IN CHANGING ROOM | (FIRST GUIDE INFORMATION) | FLOOR SURFACE | FIRST PROJECTOR SECOND PROJECTOR |
| CHANGING CLOTHES ENDS (BEFORE RADIOGRAPHY) | ARROW INDICATING MOVEMENT ROUTE TO STANDBY POSITION BETWEEN UPRIGHT IMAGING TABLE AND RADIATION SOURCE MESSAGE TO URGE MOVEMENT TO STANDBY POSITION FOOT PRINT INDICATING STANDING POSITION | (SECOND GUIDE INFORMATION) | FLOOR SURFACE | SECOND PROJECTOR THIRD PROJECTOR |
| HEIGHT POSITION ADJUSTMENT ENDS | ARROW INDICATING MOVEMENT ROUTE TO IMAGING POSITION IN IMMEDIATELY FRONT OF UPRIGHT IMAGING TABLE MESSAGE TO URGE MOVEMENT TO IMAGING POSITION FOOT PRINT INDICATING STANDING POSITION | (THIRD GUIDE INFORMATION) | FLOOR SURFACE | THIRD PROJECTOR |
| | MESSAGE INDICATING PRECAUTION REGARDING POSITION AND POSTURE OF SUBJECT WITH RESPECT TO HOLDER HUMAN PRINT INDICATING IDEAL POSITION AND POSTURE OF SUBJECT WITH RESPECT TO HOLDER | (FOURTH GUIDE INFORMATION) | HOLDER | FOURTH PROJECTOR |
| RADIOGRAPHY ENDS | ARROW INDICATING MOVEMENT ROUTE TO CHANGING ROOM MESSAGE TO URGE CHANGING CLOTHES IN CHANGING ROOM | (FIFTH GUIDE INFORMATION) | FLOOR SURFACE | SECOND PROJECTOR THIRD PROJECTOR |
| CHANGING CLOTHES ENDS (AFTER RADIOGRAPHY) | ARROW INDICATING MOVEMENT ROUTE TO FIRST DOOR MESSAGE TO URGE LEAVING RADIOGRAPHY ROOM | (SIXTH GUIDE INFORMATION) | FLOOR SURFACE | FIRST PROJECTOR SECOND PROJECTOR |

IMAGING SUPPORT APPARATUS, OPERATION METHOD OF IMAGING SUPPORT APPARATUS, AND OPERATION PROGRAM OF IMAGING SUPPORT APPARATUS

CROSS-REFERENCE TO RELATED APPLICATIONS

The present application claims priority under 35 U.S.C. § 119 to Japanese Patent Application No. 2022-044571, filed on Mar. 18, 2022. The above application is hereby expressly incorporated by reference, in its entirety, into the present application.

BACKGROUND

1. Technical Field

The technology of the present disclosure relates to an imaging support apparatus, an operation method of an imaging support apparatus, and an operation program of an imaging support apparatus.

2. Description of the Related Art

In a case of radiography by a medical image capturing system, for example, a radiography system, there are many things that an operator, such as a medical radiologist, should do, such as guiding a subject (patient) from a waiting room to a radiography room, oral explanation, such as a caution during radiography, and guiding and positioning of the subject to an imaging table. In order to reduce such a burden on the operator, JP2011-177326A proposes the technology of displaying guide information corresponding to a progress status of the radiography on a monitor.

JP2011-177326A shows a computed tomography (CT) imaging system as an example of the medical image capturing system. In addition, as an example of the guide information, a message urging the user to enter an imaging room, such as "Please enter the imaging room", a message indicating a precaution, such as "Please do not wear metal", a message guiding the subject to bed, such as "Please lie down on the bed", and an illustration indicating a position and a posture of the subject on the bed are shown.

SUMMARY

Many guide information is difficult for the subject to intuitively understand just by displaying the guide information on the monitor. Therefore, the technology disclosed in JP2011-177326A is insufficient for the subject to intuitively understand the guide information.

One embodiment according to the technology of the present disclosure provides an imaging support apparatus, an operation method of an imaging support apparatus, and an operation program of an imaging support apparatus capable of making the subject intuitively understand the guide information.

The present disclosure relates to an imaging support apparatus used in a medical image capturing system that performs imaging of a medical image of a subject in an imaging room, the apparatus comprising a processor, in which the processor acquires progress status information indicating a progress status of the imaging, and performs control of causing a projector to project guide information which is related to the imaging aimed at the subject, the guide information corresponding to the progress status information, onto a preset projection surface of the imaging room.

It is preferable that the guide information include information indicating a movement route of the subject in the imaging room, and the projection surface be a floor surface of the imaging room.

It is preferable that the processor acquire subject position information indicating a position of the subject in the imaging room, and output a warning in a case in which the position of the subject indicated by the subject position information deviates from the movement route.

It is preferable that the guide information include information indicating a standing position of the subject in the imaging room, and the projection surface be a floor surface of the imaging room.

It is preferable that the processor acquire subject position information indicating a position of the subject in the imaging room, and output a warning in a case in which the position of the subject indicated by the subject position information deviates from the standing position.

It is preferable that the guide information include information indicating at least any one of a position or a posture of the subject with respect to an imaging table on which the subject is positioned for the imaging, and the projection surface be the imaging table, a wall surface of the imaging room around the imaging table, or a ceiling of the imaging room above the imaging table.

It is preferable that, in a case in which brightness of the imaging room is equal to or larger than a preset threshold value, the processor perform control of setting the brightness of the imaging room to be less than the threshold value.

It is preferable that the medical image capturing system be a radiography system.

The present disclosure relates to an operation method of an imaging support apparatus used in a medical image capturing system that performs imaging of a medical image of a subject in an imaging room, the method comprising acquiring progress status information indicating a progress status of the imaging, and performing control of causing a projector to project guide information which is related to the imaging aimed at the subject, the guide information corresponding to the progress status information, onto a preset projection surface of the imaging room.

The present disclosure relates to an operation program of an imaging support apparatus used in a medical image capturing system that performs imaging of a medical image of a subject in an imaging room, the program causing a computer to execute a process comprising acquiring progress status information indicating a progress status of the imaging, and performing control of causing a projector to project guide information which is related to the imaging aimed at the subject, the guide information corresponding to the progress status information, onto a preset projection surface of the imaging room.

According to the technology of the present disclosure, it is possible to provide the imaging support apparatus, the operation method of the imaging support apparatus, and the operation program of the imaging support apparatus capable of making the subject intuitively understand the guide information.

BRIEF DESCRIPTION OF THE DRAWINGS

Exemplary embodiments according to the technique of the present disclosure will be described in detail based on the following figures, wherein:

FIG. 12 is a diagram showing sixth guide information projected onto the floor surface of the radiography room in a case in which the progress status of the radiography is "changing clothes ends (after the radiography)";

FIG. 13 is a table summarizing the progress status of the radiography, the guide information, the projection surface, and an operating projector;

DETAILED DESCRIPTION

First Embodiment

Figure 1:
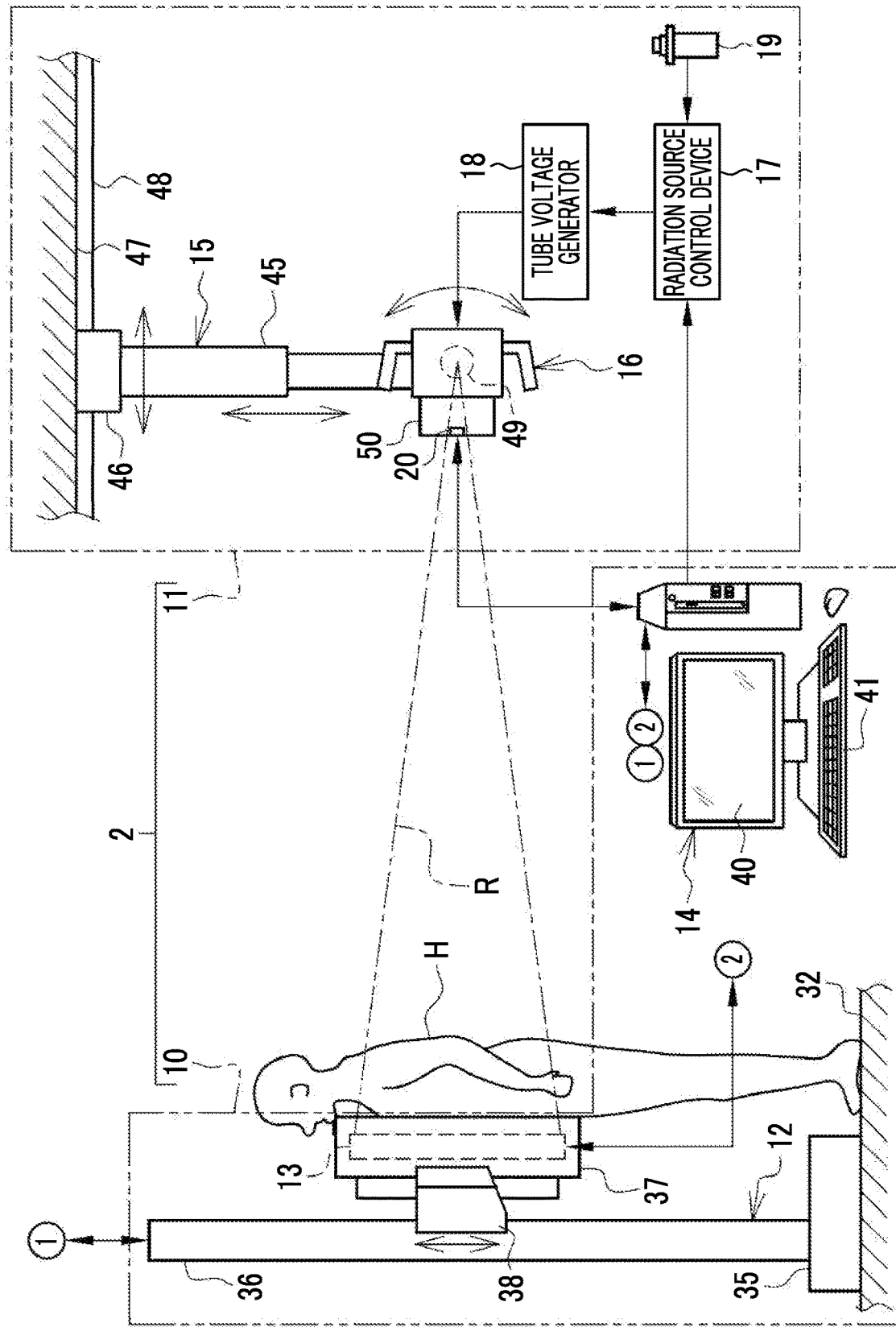
FIG. 1 is a diagram showing a radiography system.

As shown in FIG. 1 as an example, a radiography system 2 is a system that performs radiography of a subject H by using radiation R, such as X-rays and y-rays. The radiography system 2 is an example of a "medical image capturing system" according to the technology of the present disclosure. The radiography system 2 is composed of a radiography apparatus 10 and a radiation generation device 11. The radiography apparatus 10 includes an upright imaging table 12, an electronic cassette 13, and a console 14. The radiation generation device 11 includes a radiation source suspension device 15, a radiation source 16, a radiation source control device 17, a tube voltage generator 18, and an irradiation switch 19. A first camera 20 is attached to the radiation source 16.

Figure 2:
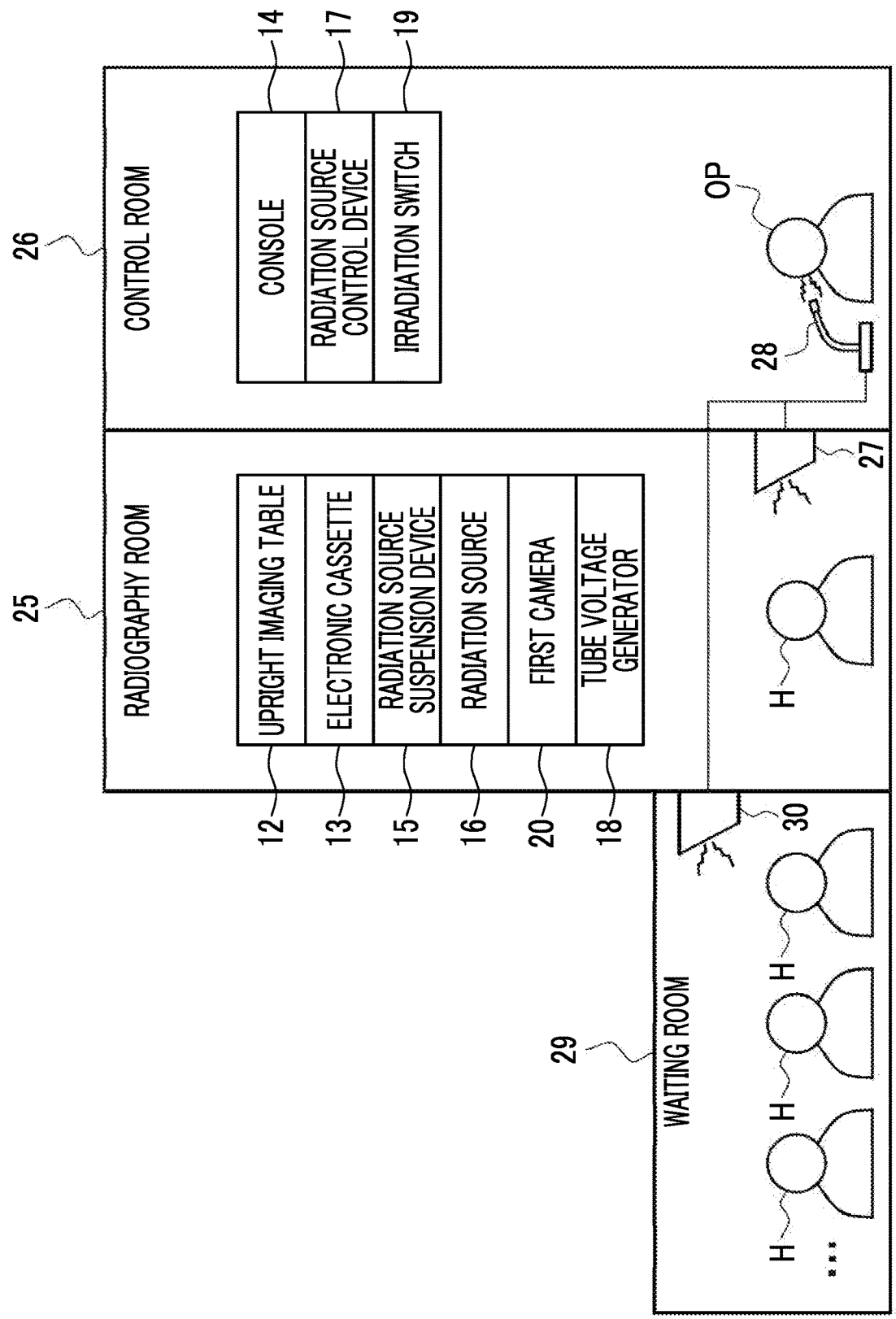
FIG. 2 is a diagram showing a radiography room, a control room, and a waiting room.

As an example, as shown in FIG. 2, the upright imaging table 12, the electronic cassette 13, the radiation source suspension device 15, the radiation source 16, the first camera 20, and the tube voltage generator 18 are installed in a radiography room 25. On the other hand, the console 14, the radiation source control device 17, and the irradiation switch 19 are installed in a control room 26 adjacent to the radiography room 25. The radiography room 25 is an example of an "imaging room" according to the technology of the present disclosure. It should be noted that, in order to make it easier for the subject H to visually recognize guide information 79 described below, a curtain is closed or a room light 170 (see FIG. 29) is turned off, so that the radiography room 25 has brightness less than a preset threshold value.

A speaker 27 is installed in the radiography room 25, and a microphone 28 is installed in the control room 26. The speaker 27 outputs an utterance sound of an operator OP in the control room 26, which is collected by the microphone 28. With the speaker 27 and the microphone 28, it is possible to achieve communication between the subject H in the radiography room 25 and the operator OP in the control room 26. A speaker 30 is also installed in a waiting room 29 of the subject H. Through the speaker 30 and the microphone 28, the operator OP makes an announcement for guiding the subject H, whose an order of the radiography has come, from the waiting room 29 to the radiography room 25.

Returning to FIG. 1, the upright imaging table 12 is an imaging table for performing the radiography of the subject H in an upright posture. The upright imaging table 12 includes a seat 35 installed on a floor surface 32 of the radiography room 25, a support column 36 extending in a height direction from the seat 35, and a holder 37 that holds the electronic cassette 13 inside. The holder 37 is connected to the support column 36 via a connecting part 38. The connecting part 38 and thus the holder 37 are moved up and down with respect to the support column 36 by a motor or the like in accordance with an imaging part or a physique of the subject H. The holder 37 can be moved up and down from the control room 26 through the console 14. A height position of the holder 37 is detected by a linear encoder, for example. The upright imaging table 12 transmits height position information 77 (see FIG. 5) indicating the height position of the holder 37 to the console 14.

The electronic cassette 13 is a portable radiation image detector that detects a radiation image 76 (see FIG. 5) corresponding to the radiation R transmitted through the subject H. The electronic cassette 13 is connected to the console 14 in a communicable manner by wire or wirelessly. The electronic cassette 13 is accommodated in the holder 37 of the upright imaging table 12 and used. In addition, the electronic cassette 13 can be used by being removed from the holder 37 and held by the subject H, or by being inserted under the subject H lying down on a bed in a hospital room.

The electronic cassette 13 includes a detection panel in which a plurality of pixels accumulating charges corresponding to the radiation R are arranged in a two-dimensional matrix. The detection panel is also called a flat panel detector (FPD). In a case in which the irradiation with the radiation R is started, the detection panel starts an accumulation operation of accumulating the charge in the pixel. In a case in which the irradiation with the radiation R ends, the detection panel starts a readout operation of reading out the charge accumulated in the pixel as an electric signal.

The console 14 is a desktop personal computer, for example. The console 14 is an example of an "imaging support apparatus" according to the technology of the present disclosure. The console 14 includes a display 40 that displays various screens, and an input device 41 that includes a keyboard, a mouse, and the like, and receives an operation instruction of the operator OP. The console 14 transmits various signals to the electronic cassette 13. In addition, the console 14 receives the radiation image 76 from the electronic cassette 13. The console 14 displays the radiation image 76 on the display 40. It should be noted that the console 14 may be a laptop personal computer, a tablet terminal, or the like.

The radiation source suspension device 15 includes an arm 45 and a carriage 46. The radiation source 16 is attached to a distal end of the arm 45, and a base end of the arm 45 is attached to the carriage 46. The arm 45 can be expanded and contracted along a vertical direction by the motor or the like. By expanding and contracting the arm 45 in the vertical direction, the height position of the radiation source 16 can be changed in accordance with the imaging part or the physique of the subject H. The expansion/contraction positions of the arm 45 and thus the height position of the radiation source 16 are detected by the linear encoder, for example. In addition, in order to adjust an incidence angle of the radiation R to the subject H, the radiation source 16 is rotated about an axis perpendicular to a paper surface with respect to the arm 45 by the motor or the like. A rotation angle of the radiation source 16 is detected by, for example, a rotary encoder or a potentiometer. In the same manner as the moving up and down of the holder 37, moving up and down and rotating of the radiation source 16 can also be performed from the control room 26 through the console 14.

The carriage 46 is connected to a rail 48 laid on a ceiling 47 of the radiography room 25. The rail 48 is linear and is parallel to a normal line of a detection surface of the radiation R of the electronic cassette 13 accommodated in the holder 37. The carriage 46 and thus the radiation source 16 can move in parallel along the rail 48 by the motor or the like. In this way, the radiation source 16 moves in parallel along the rail 48, so that a source to image receptor distance (SID), which is a distance from a generation point of the radiation R to the detection surface of the radiation R of the electronic cassette 13, is changed. A position of the carriage 46 with respect to the rail 48 is detected by the linear encoder, for example. In the same manner as the moving up and down of the holder 37 or the like, the parallel movement of the radiation source 16 can be performed from the control room 26 through the console 14.

The radiation source 16 includes a radiation tube 49 and an irradiation field limiter 50. The radiation tube 49 is provided with a filament, a target, a grid electrode, and the like (all of which are not shown). A voltage is applied between the filament, which is a cathode, and the target, which is an anode. The voltage applied between the filament and the target is called a tube voltage. The filament releases thermoelectrons corresponding to the applied tube voltage toward the target. The target emits the radiation R by collision of the thermoelectrons from the filament. The grid electrode is disposed between the filament and the target. The grid electrode changes a flow rate of the thermoelectrons from the filament toward the target in accordance with the applied voltage. The flow rate of the thermoelectrons from the filament toward the target is called a tube current.

The irradiation field limiter 50 is also called a collimeter and limits an irradiation field of the radiation R emitted from the radiation tube 49. The irradiation field limiter 50 has a configuration in which, for example, four shielding plates, such as lead, which shield the radiation R are disposed on respective sides of the quadrangle and an emission opening of the quadrangle that transmits the radiation R is formed in a central portion. The irradiation field limiter 50 changes a size of the emission opening by changing a position of each shielding plate, thereby changing the irradiation field of the radiation R.

The tube voltage generator 18 and the irradiation switch 19 are connected to the radiation source control device 17. The radiation source control device 17 controls an operation of the radiation source 16 in response to various instruction signals from the irradiation switch 19. The irradiation switch 19 is operated in a case in which the operator OP instructs the radiation source 16 to start the irradiation with the radiation R.

An irradiation condition 73 (see FIG. 5) of the radiation R is set in the radiation source control device 17. The irradiation condition 73 is the tube voltage, the tube current, and the irradiation time of the radiation R applied to the radiation tube 49. In a case in which the instruction to start the irradiation with the radiation R is given by the operation of the irradiation switch 19, the radiation source control device 17 operates the tube voltage generator 18 in accordance with the set irradiation condition 73 to emit the radiation R from the radiation tube 49. The radiation source control device 17 stops the irradiation with the radiation R from the radiation tube 49 in a case in which the irradiation time set in the irradiation condition 73 elapses after the irradiation with the radiation R is started. The tube voltage generator 18 generates the tube voltage by boosting an input voltage with a transformer. The tube voltage generated by the tube voltage generator 18 is supplied to the radiation tube 49 through a voltage cable (not shown).

It should be noted that the irradiation with the radiation R may end by an auto exposure control (AEC) function. The AEC function is a function of detecting the dose of the radiation R that has reached the electronic cassette 13 during the irradiation with the radiation R, and stopping the irradiation of the radiation R from the radiation tube 49 at a point in time at which a cumulative dose which is an integrated value of the detected dose, reaches a preset target dose. In this case, the detection panel of the electronic cassette 13 starts the readout operation in a case in which the cumulative dose of the radiation R reaches the target dose.

Figure 3:
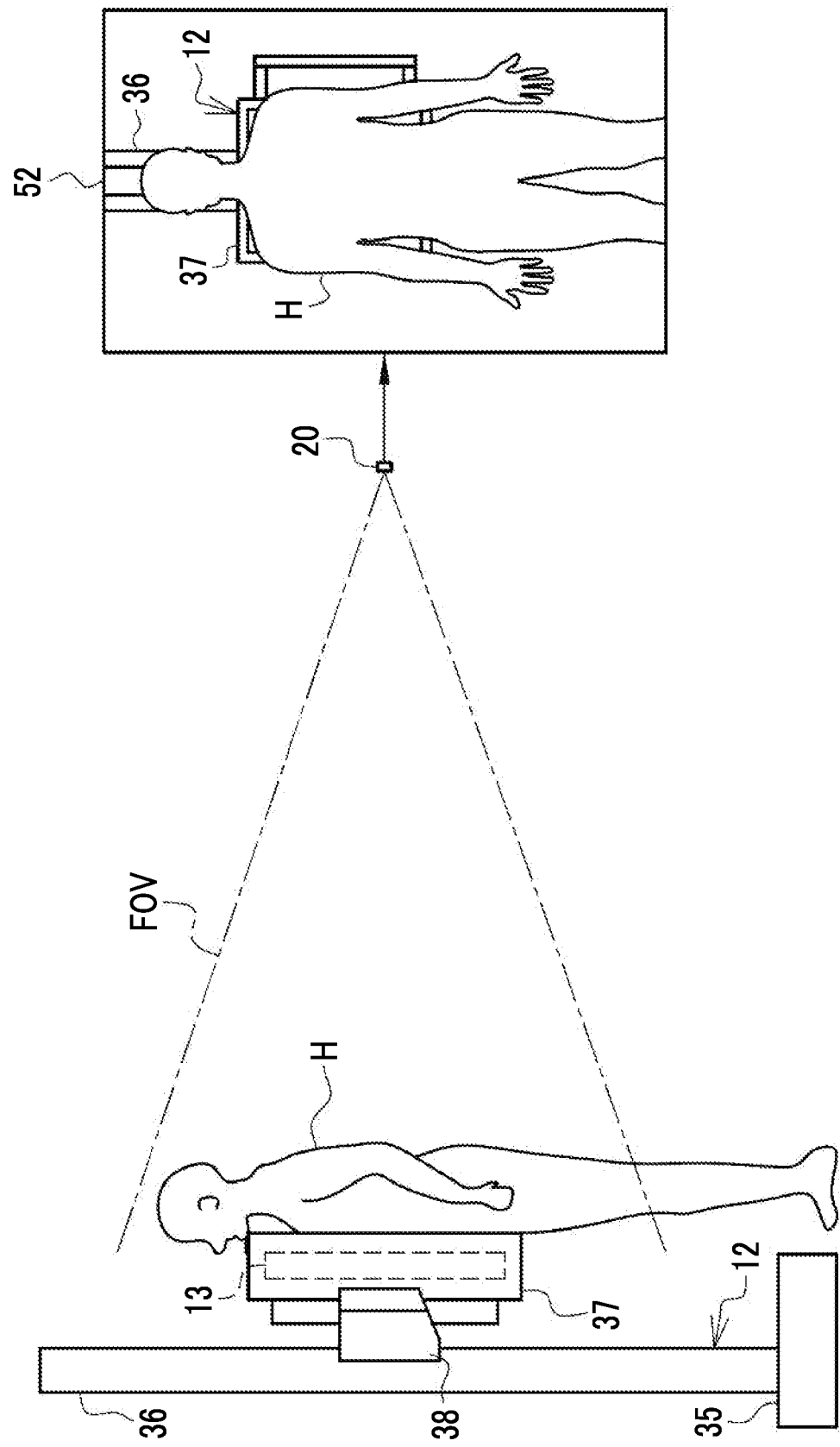
FIG. 3 is a diagram showing a state in which a first optical image is captured by a first camera.

The first camera 20 is a digital camera which captures a digital first optical image 52 (see FIG. 3). The first camera 20 is attached to the center of a distal end of the irradiation field limiter 50 of the radiation source 16. The first camera 20 is connected to the console 14 in a communicable manner by wire or wirelessly. The first camera 20 images the subject H standing in front of the upright imaging table 12 for the radiography in response to an imaging instruction from the console 14. The imaging instruction for the optical image 52 to the first camera 20 through the console 14 is, for example, given by the operator OP after guiding the subject H from the waiting room 29 to the radiography room 25 and causing the subject H to stand at a standby position between the upright imaging table 12 and the radiation source 16. The first camera 20 transmits the captured first optical image 52 to the console 14. It should be noted that the first camera 20 may be built in the irradiation field limiter 50.

FIG. 3 shows an example of a state in which the first camera 20 images the subject H standing in front of the upright imaging table 12 in response to the imaging instruction of the operator. The first camera 20 is a field of view FOV capable of imaging the back surface of the subject H standing in front of the upright imaging table 12 from the crown to below the knee (the entire upper body and a part of the lower body). In the first optical image 52 captured by the first camera 20 in this way, a part of the upright imaging table 12 and the back surface of the subject H standing in front of the upright imaging table 12 from the crown to below the knee are shown.

Figure 4:
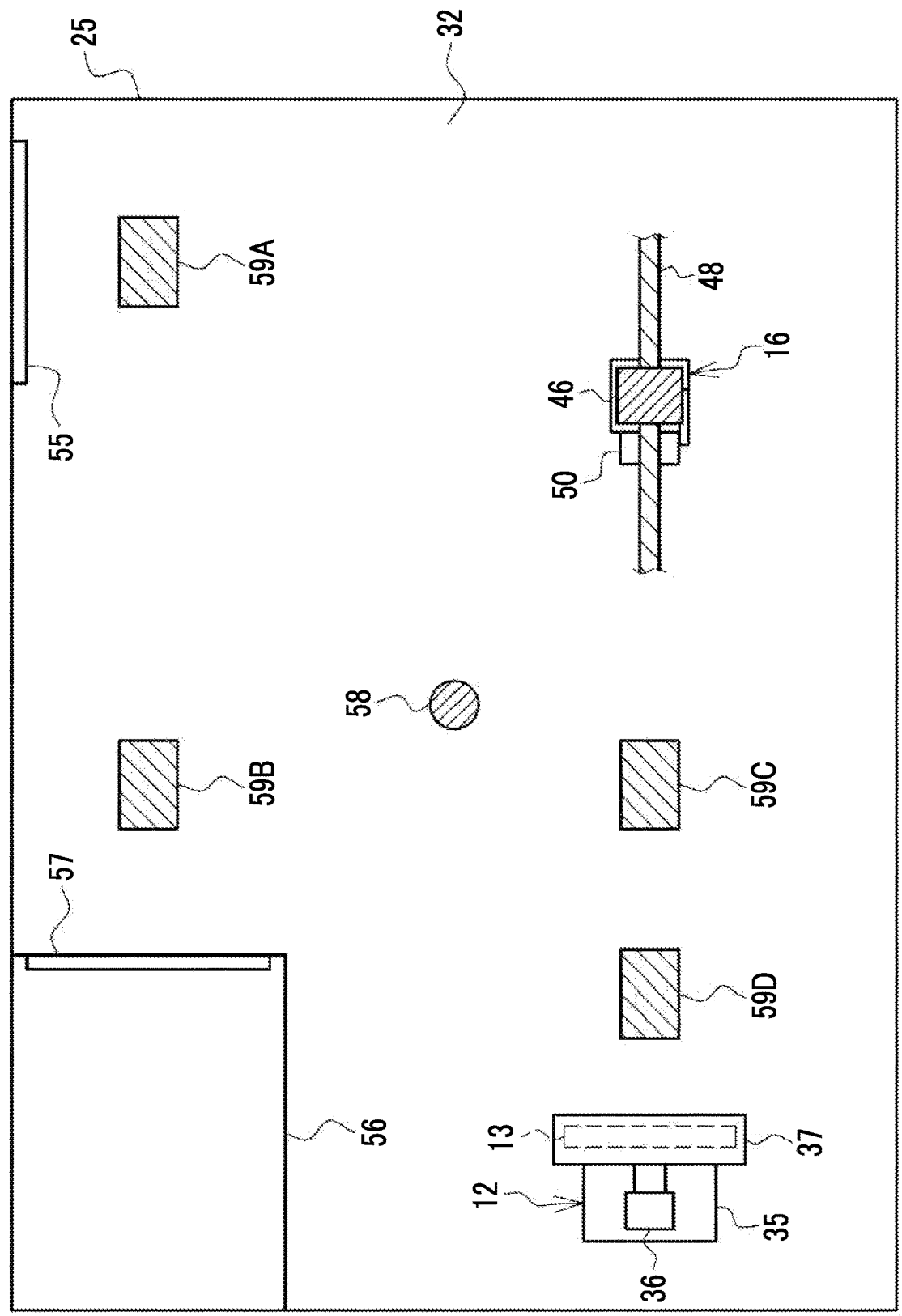
FIG. 4 is a diagram showing a layout of the radiography room.

As shown in FIG. 4 as an example, the radiography room 25 is a rectangular room having four corners. A first door 55 that opens and closes an entrance/exit leading to the waiting room 29 is provided at one corner of the four corners of the radiography room 25. A changing room 56 is provided at the corner of the right hand side of a person standing at the first door 55. The changing room 56 can be accessed through a second door 57. The changing room 56 is a place in which the subject H before the radiography changes his/her clothes to examination clothes or the subject H after the radiography changes the examination clothes to his/her clothes. It should be noted that, although not shown, a locker is installed in the changing room 56.

The upright imaging table 12 is installed at a corner that is diagonal to the corner at which the first door 55 is provided and faces the corner at which the changing room 56 is provided. The upright imaging table 12 is disposed such that the detection surface of the radiation R of the electronic cassette 13 accommodated in the holder 37 is parallel to the short side (vertical to the long side) of the floor surface 32 of the radiography room 25. The radiation source suspension device 15 (not shown except for the carriage 46) and the radiation source 16 are disposed at positions facing the upright imaging table 12.

A second camera 58 is attached to the center of the ceiling 47 of the radiography room 25. The second camera 58 is a digital camera which captures a digital second optical image 78 (see FIG. 5). The second camera 58 is an omnidirectional camera that images a panorama of the radiography room 25. The second camera 58 is connected to the console 14 in a communicable manner by wire or wirelessly. The second camera 58 transmits the captured second optical image 78 to the console 14.

A total of four projectors of a first projector 59A, a second projector 59B, a third projector 59C, and a fourth projector 59D, are attached to the ceiling 47 of the radiography room 25. These first projector 59A to fourth projector 59D are, for example, digital light processing (DLP) type projectors, and are examples of a "projector" according to the technology of the present disclosure. The first projector 59A to the fourth projector 59D project the guide information 79 (see FIG. 5) which is related to the imaging aimed at the subject H onto a preset projection surface of the radiography room 25. The first projector 59A is disposed on the first door 55. The second projector 59B is disposed on the second door 57 of the changing room 56. The third projector 59C is disposed between the upright imaging table 12 and the radiation source 16 and at a position slightly separated from the upright imaging table 12. The fourth projector 59D is disposed between the upright imaging table 12 and the radiation source 16 and at a position closer to the upright imaging table 12 than the third projector 59C. The first projector 59A to the fourth projector 59D are connected to the console 14 in a communicable manner by wire or wirelessly. In the following description, unless it is particularly necessary to distinguish between the first projector 59A to the fourth projector 59D, the first projector 59A to the fourth projector 59D may be collectively referred to as a projector 59.

The first projector 59A, the second projector 59B, and the third projector 59C project the guide information 79 onto the floor surface 32 of the radiography room 25 (see FIGS. 7 to 9, 11, and 12). The projection positions of the guide information 79 by the first projector 59A to the third projector 59C are fixed. On the other hand, the fourth projector 59D projects the guide information 79 onto the holder 37 of the upright imaging table 12 (see FIG. 10). The projection position of the guide information 79 by the fourth projector 59D is variable. The floor surface 32 and the holder 37 are examples of a "projection surface" according to the technology of the present disclosure.

Figure 5:
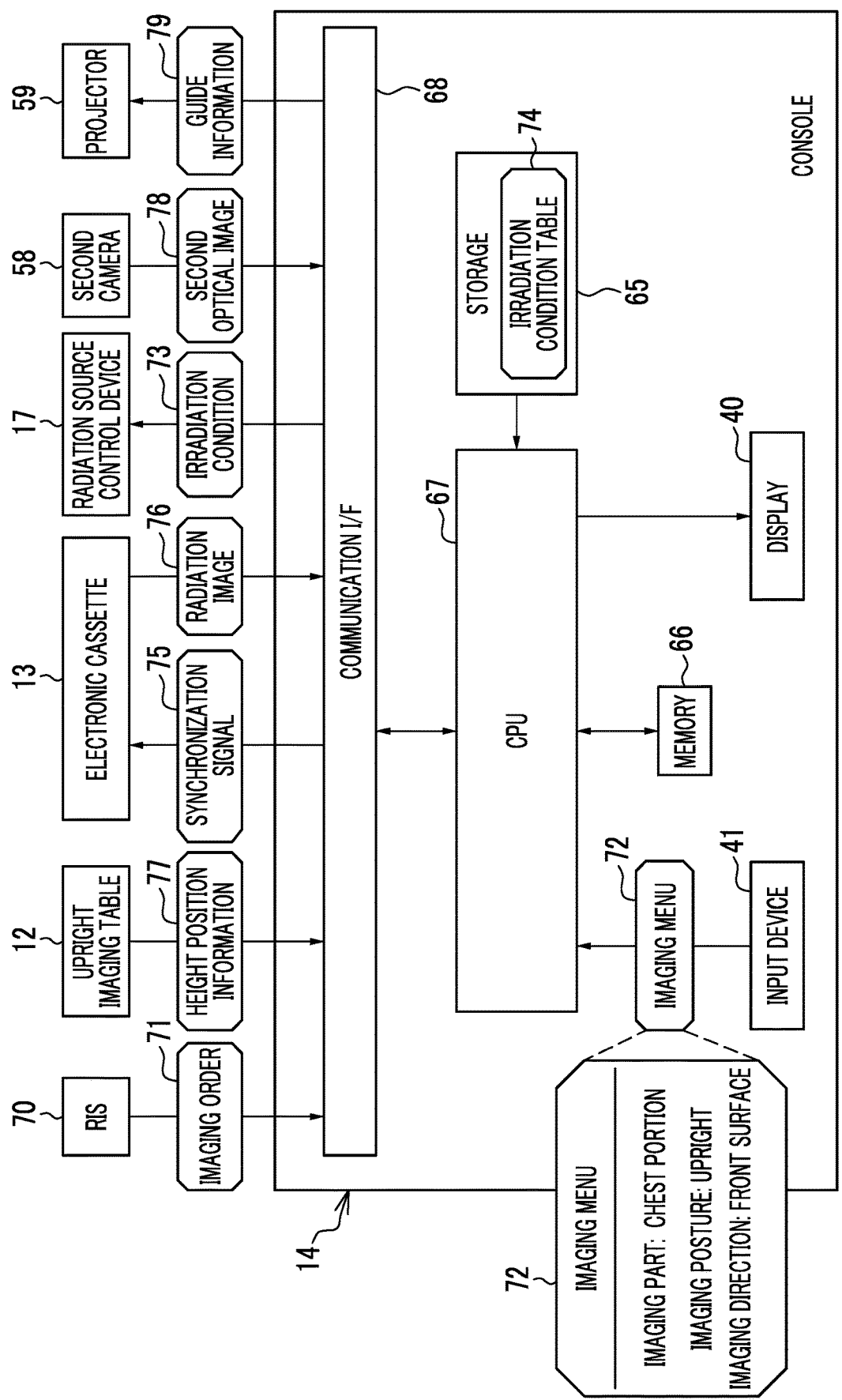
FIG. 5 is a block diagram showing a configuration of a console.

As shown in FIG. 5 as an example, the console 14 comprises a storage 65, a memory 66, a central processing unit (CPU) 67, and a communication interface (I/F) 68, in addition to the display 40 and the input device 41 described above. The display 40, the input device 41, the storage 65, the memory 66, the CPU 67, and the communication I/F 68 are connected to each other via a busline (not shown). The storage 65, the memory 66, the CPU 67, and the busline are examples of a "computer" according to the technology of the present disclosure.

The storage 65 is a hard disk drive built in the computer constituting the console 14 or connected to the computer through a cable or a network. In the storage 65, a control program, such as an operating system, various application programs, various data associated with such programs, and the like are stored. It should be noted that a solid state drive may be used instead of the hard disk drive.

The memory 66 is a work memory for the CPU 67 to execute processing. The CPU 67 loads the program stored in the storage 65 into the memory 66 and executes the processing in accordance with the program. As a result, the CPU 67 controls each unit of the computer in an integrated manner. The CPU 67 is an example of a "processor" according to the technology of the present disclosure. It should be noted that the memory 66 may be built in the CPU 67. The communication I/F 68 controls transmission of various types of information with an external device, such as the electronic cassette 13.

The CPU 67 receives an imaging order 71 from the radiology information system (RIS) 70 via the communication I/F 68. In the imaging order 71, a subject identification data (ID) for identifying the subject H, an instruction of an imaging technique by a doctor or the like of a medical department who has issued the imaging order 71, and the like are registered. The CPU 67 displays the imaging order 71 on the display 40 in response to the operation of the operator OP by the input device 41. The operator OP confirms a content of the imaging order 71 through the display 40.

The CPU 67 displays a plurality of types of imaging menus 72 on the display 40 in a manner in which a plurality of types of imaging menus 72 can be selected. The imaging menu 72 defines an imaging technique in which an imaging part of the subject H, an imaging posture of the subject H, and an imaging direction of the subject H are set as one set, such as "chest portion, upright, front surface". The imaging part includes a head portion, a neck portion, an abdomen portion, a waist portion, a shoulder, an elbow, a hand, a knee, an ankle, and the like, in addition to the chest portion. The imaging posture includes decubitus, sitting, and the like, in addition to the upright. The imaging direction includes a back surface, a side surface, and the like, in addition to the front surface. The operator OP operates the input device 41 to select one imaging menu 72 that matches the imaging technique designated in the imaging order 71 from among the plurality of types of imaging menus 72. As a result, the CPU 67 receives the imaging menu 72. The CPU 67 reads out the irradiation condition 73 corresponding to the received imaging menu 72 from an irradiation condition table 74 stored in the storage 65. The CPU 67 displays the read out irradiation condition 73 on the display 40. In the irradiation condition table 74, the irradiation conditions 73 corresponding to the various imaging menus 72 are registered. As described above, the irradiation condition 73 is the tube voltage and the tube current applied to the radiation tube 49, and the irradiation time of the radiation R. Instead of the tube current and the irradiation time, a tube current irradiation time product may be set as the irradiation condition 73. It should be noted that, in the following, a case of chest portion upright front surface imaging will be described as an example.

The CPU 67 transmits the set irradiation condition 73 to the radiation source control device 17 via the communication I/F 68. In addition, although not shown, in a case in which the radiation source control device 17 is instructed to start the irradiation with the radiation R through the irradiation switch 19, the CPU 67 receives an irradiation start signal indicating that the irradiation with the radiation R is started from the radiation source control device 17. In a case in which the irradiation start signal is received, the CPU 67 transmits a synchronization signal 75 indicating that the irradiation with the radiation R is started to the electronic cassette 13. Further, the CPU 67 receives an irradiation end signal 97 (see FIG. 6) indicating that the irradiation with the radiation R ends from the radiation source control device 17. In a case in which the irradiation end signal 97 is received, the CPU 67 transmits the synchronization signal 75 indicating that the irradiation with the radiation R ends to the electronic cassette 13.

In a case in which the synchronization signal 75 indicating that the irradiation with the radiation R is started is received from the console 14, the electronic cassette 13 causes the detection panel to start the accumulation operation. In addition, in a case in which the synchronization signal 75 indicating that the irradiation with the radiation R ends is received from the console 14, the electronic cassette 13 causes the detection panel to start the readout operation. It should be noted that the electronic cassette 13 may be provided with a function of detecting the start of the irradiation with the radiation R and the end of the irradiation with the radiation R, the detection panel may be caused to start the accumulation operation in a case in which the start of the irradiation with the radiation R is detected by this function, and the detection panel may be caused to start the readout operation in a case in which the end of the irradiation with the radiation R is detected.

The CPU 67 receives the radiation image 76 from the electronic cassette 13 via the communication I/F 68. The CPU 67 performs various types of image processing on the radiation image 76 and then displays the radiation image 76 on the display 40 and provides the radiation image 76 for viewing by the operator OP.

The CPU 67 receives the height position information 77 from the upright imaging table 12 via the communication I/F 68. In addition, the CPU 67 receives the second optical image 78 from the second camera 58 via the communication I/F 68. Further, although not shown, the CPU 67 receives the first optical image 52 from the first camera 20 via the communication I/F 68. The CPU 67 displays the first optical image 52 on the display 40 and provides the first optical image 52 for viewing by the operator OP.

The CPU 67 transmits the guide information 79 to the projector 59 via the communication I/F 68. As will be described below, there are six types of the guide information 79 of first guide information 79A, second guide information 79B, third guide information 79C, fourth guide information 79D, fifth guide information 79E, and sixth guide information 79F. In the following description, unless it is particularly necessary to distinguish between the first guide information 79A to the sixth guide information 79F, the first guide information 79A to the sixth guide information 79F may be collectively referred to as the guide information 79.

Figure 6:
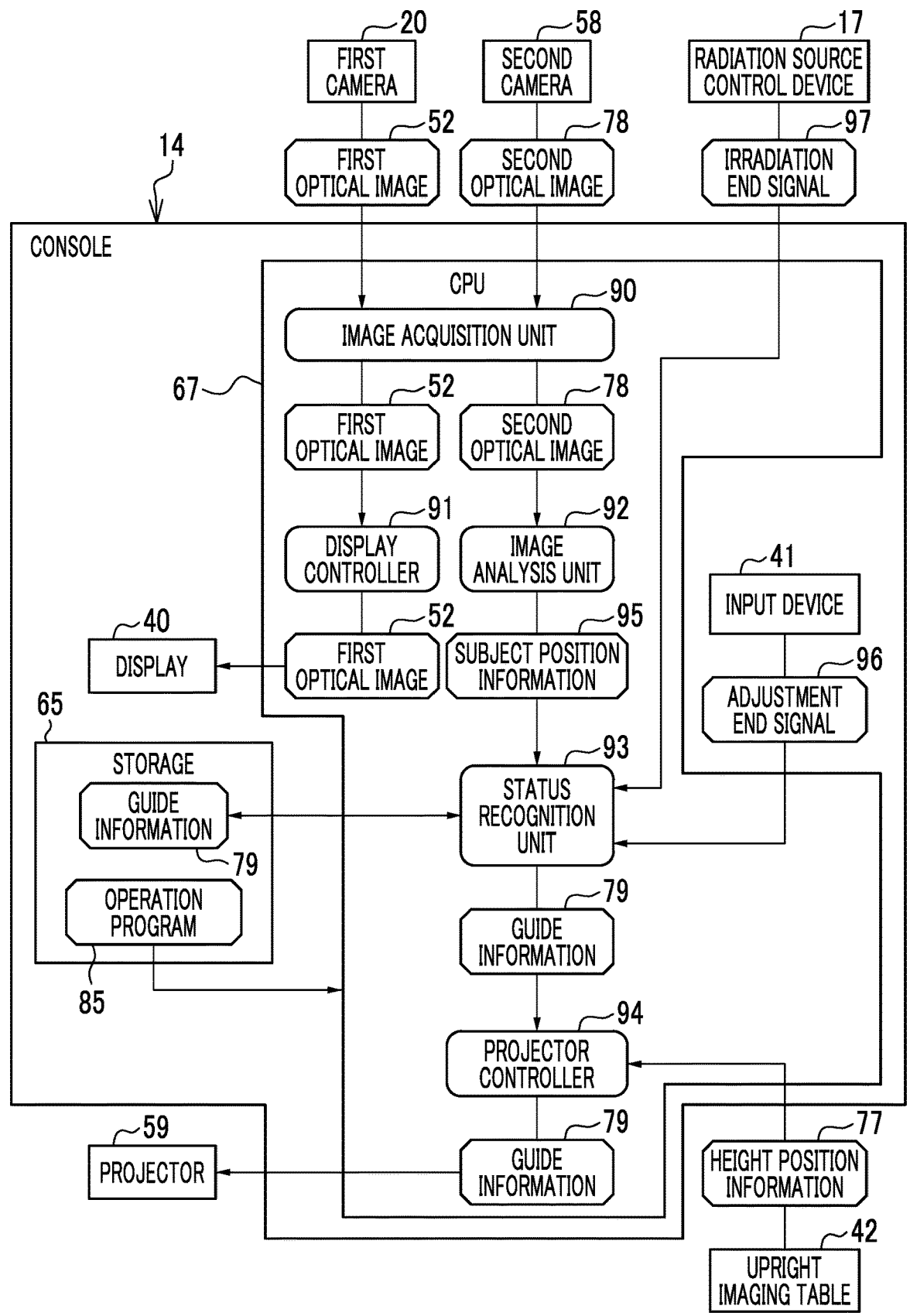
FIG. 6 is a block diagram showing a processing unit of a CPU of the console.

As an example, as shown in FIG. 6, an operation program 85 is stored in the storage 65. The operation program 85 is an application program causing the computer to function as the imaging support apparatus. That is, the operation program 85 is an example of an "operation program of an imaging support apparatus" according to the technology of the present disclosure. The guide information 79 is also stored in the storage 65.

In a case in which the operation program 85 is activated, the CPU 67 cooperates with the memory 66 and the like to function as an image acquisition unit 90, a display controller 91, an image analysis unit 92, a status recognition unit 93, and a projector controller 94.

The image acquisition unit 90 sequentially acquires the first optical images 52 output from the first camera 20 at a predetermined frame rate. In addition, the image acquisition unit 90 sequentially acquires the second optical images 78 output from the second camera 58 at a predetermined frame rate. The image acquisition unit 90 outputs the first optical image 52 to the display controller 91. In addition, the image acquisition unit 90 outputs the second optical image 78 to the image analysis unit 92.

The display controller 91 controls to display various screens on the display 40. The various screens include a display screen of the imaging order 71, a selection screen of the imaging menu 72, a display screen of the first optical image 52, a display screen of the radiation image 76, and the like.

The image analysis unit 92 performs the image analysis on the second optical image 78 and detects a position of the subject H in the radiography room 25. More specifically, the image analysis unit 92 recognizes the subject H shown in the second optical image 78 by using a well-known image recognition technology. The image analysis unit 92 detects a position at which the subject H is actually located in the radiography room 25 depending on the position of the recognized subject H shown in the second optical image 78 based on a known correspondence relationship between a position of the second optical image 78 and an actual position of the radiography room 25. The image analysis unit 92 outputs subject position information 95 indicating the position of the subject H in the radiography room 25 to the status recognition unit 93. The subject position information 95 is an example of "progress status information" according to the technology of the present disclosure.

The status recognition unit 93 acquires the subject position information 95 from the image analysis unit 92. In addition, the status recognition unit 93 acquires an adjustment end signal 96 from the input device 41. The adjustment end signal 96 is input by the operator OP via the input device 41 in a case in which the adjustment of the height positions of the radiation source 16 and the holder 37 in accordance with the imaging part or the physique of the subject H ends. The adjustment end signal 96 is also an example of "progress status information" according to the technology of the present disclosure. In addition, the status recognition unit 93 acquires the irradiation end signal 97 from the radiation source control device 17. The irradiation end signal 97 is also an example of "progress status information" according to the technology of the present disclosure.

The status recognition unit 93 recognizes a progress status of the radiography from the subject position information 95, the adjustment end signal 96, and the irradiation end signal 97. The status recognition unit 93 reads out the guide information 79 in accordance with the recognized progress status from the storage 65. The status recognition unit 93 outputs the read out guide information 79 to the projector controller 94.

The projector controller 94 controls an operation of the projector 59. More specifically, the projector controller 94 outputs the guide information 79 to the projector 59, and controls the projector 59 to project the guide information 79 onto the preset projection surface of the radiography room 25.

The height position information 77 from the upright imaging table 12 is input to the projector controller 94. The height position information 77 is information detected in a case in which the operator OP inputs the adjustment end signal 96 via the input device 41. The projector controller 94 outputs the height position information 77 to the fourth projector 59D. It should be noted that, although not shown, in the CPU 67, in addition to the processing units 90 to 94, a reception unit that receives the imaging order 71 from the RIS 60, an image processing unit that performs various types of image processing on the radiation image 76, a setting unit that sets the irradiation condition 73 in the radiation source control device 17, and the like are constructed.

Figure 7:
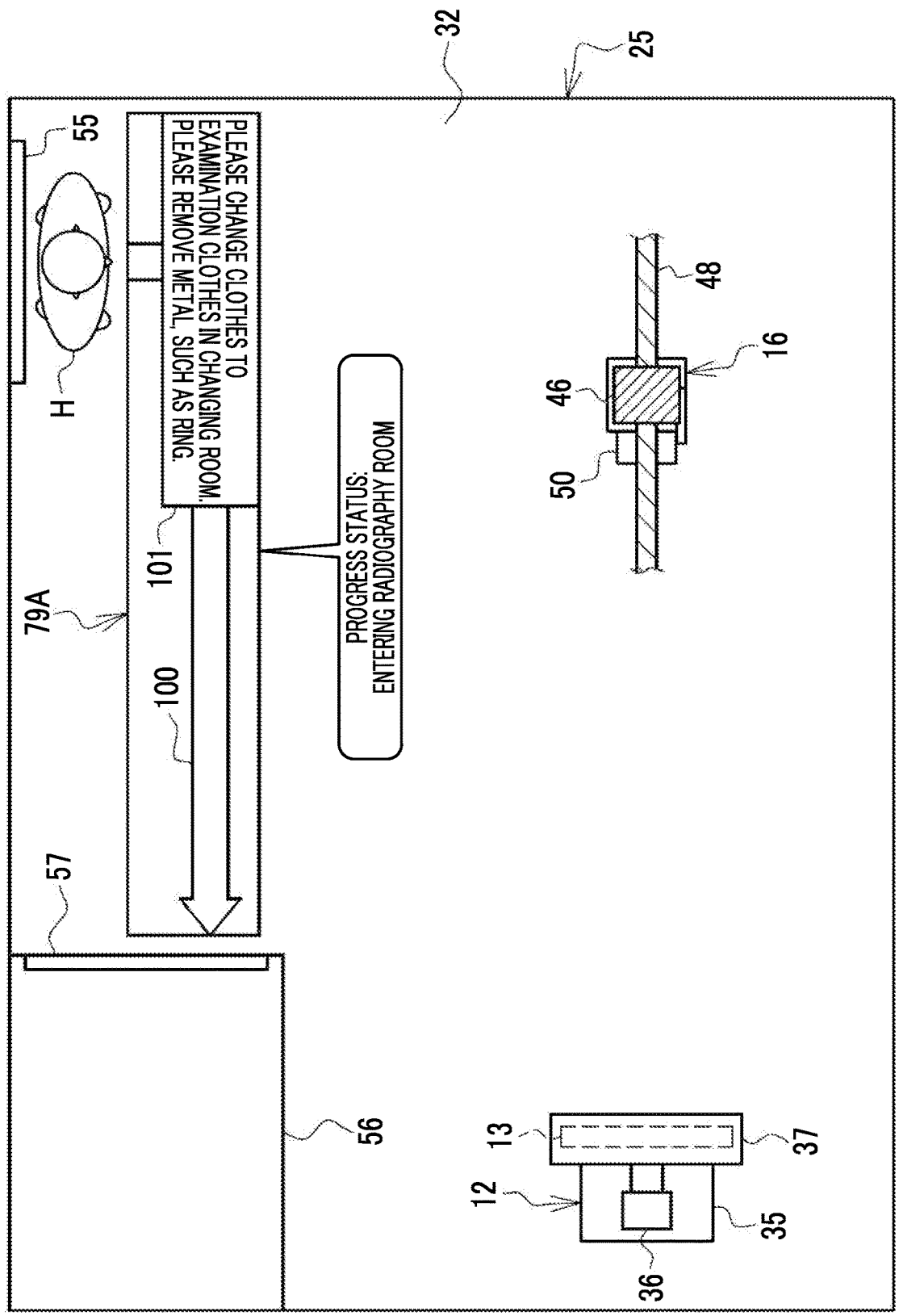
FIG. 7 is a diagram showing first guide information projected onto a floor surface of the radiography room in a case in which a progress status of radiography is "entering the radiography room"

FIG. 7 shows a case in which the status recognition unit 93 recognizes, by the subject position information 95 from the image analysis unit 92, that the subject H is in the vicinity of the first door 55 and the subject H enters the radiography room 25 from the first door 55, that is, that the progress status of the radiography is "entering the radiography room". In this case, the status recognition unit 93 reads out the first guide information 79A from the storage 65 and outputs the first guide information 79A to the projector controller 94. The projector controller 94 outputs the first guide information 79A to the first projector 59A and the second projector 59B. The first projector 59A and the second projector 59B cooperate with each other to project the first guide information 79A onto a portion of the floor surface 32 of the radiography room 25 extending from the first door 55 to the second door 57 of the changing room 56.

The first guide information 79A includes an arrow 100 and a message 101. The arrow 100 indicates a movement route from the first door 55 to the second door 57 of the changing room 56. The message 101 is sentences to urge the subject H to change clothes to the examination clothes in the changing room 56 and to remove the metal.

In a case in which it is recognized by the subject position information 95 from the image analysis unit 92 that the subject H enters the changing room 56 from the second door 57, that is, the progress status of the radiography is "entering the changing room", the status recognition unit 93 outputs to the projector controller 94 that the progress status is "entering the changing room". In a case in which the status recognition unit 93 inputs that the progress status is "entering the changing room", the projector controller 94 causes the first projector 59A and the second projector 59B to stop the projection of the first guide information 79A. That is, the first projector 59A and the second projector 59B continue the projection of the first guide information 79A until the subject H moves from the first door 55 and enters the changing room 56.

Figure 8:
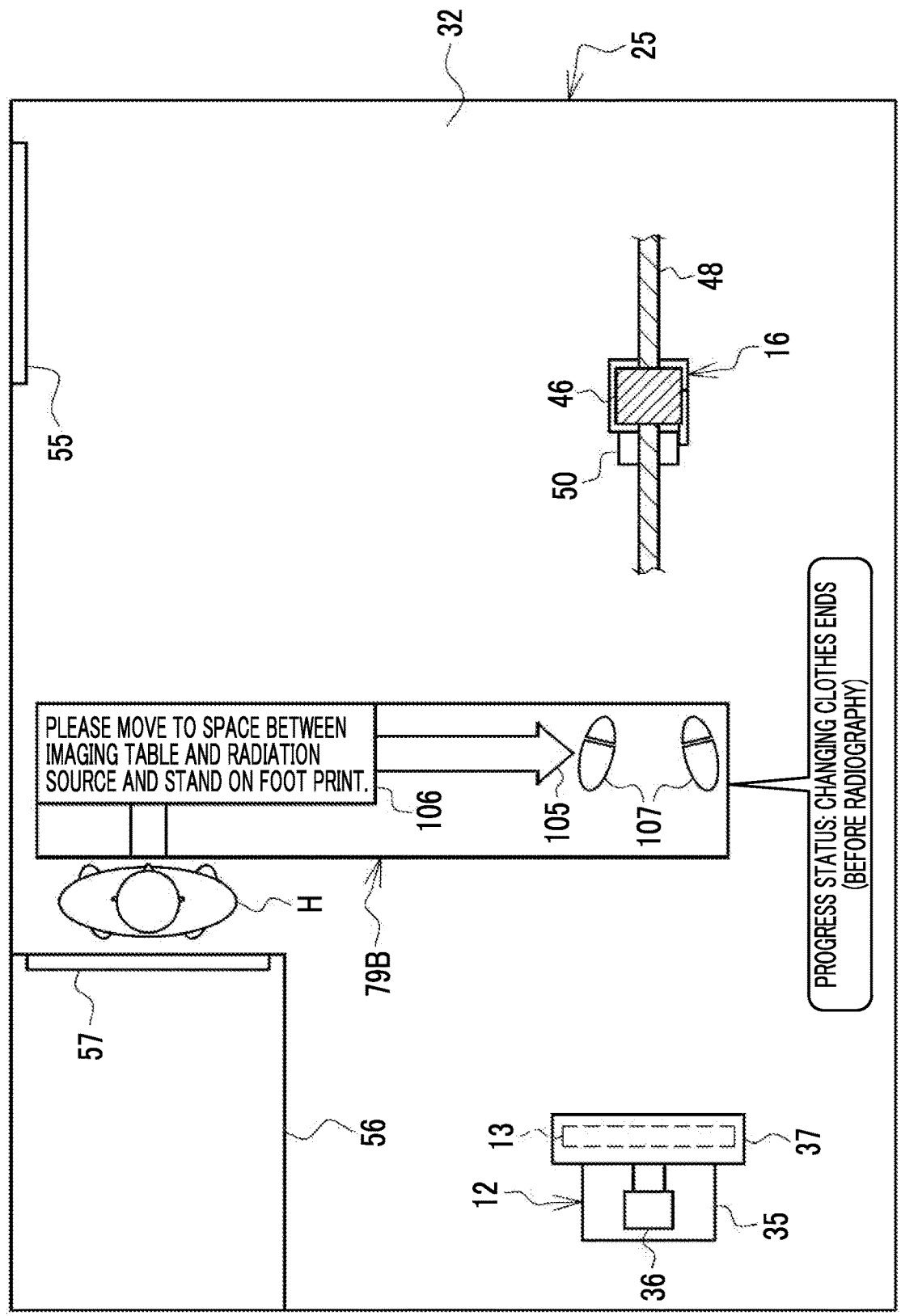
FIG. 8 is a diagram showing second guide information projected onto the floor surface of the radiography room in a case in which the progress status of the radiography is "changing clothes ends (before the radiography)"

FIG. 8 shows a case in which the status recognition unit 93 recognizes, by the subject position information 95 from the image analysis unit 92, that the subject H is in the vicinity of the second door 57 and returns from the changing room 56 to the radiography room 25 via the second door 57 after changing clothes ends, that is, the progress status of the radiography is "changing clothes ends (before the radiography)". In this case, the status recognition unit 93 reads out the second guide information 79B from the storage 65 and outputs the second guide information 79B to the projector controller 94. The projector controller 94 outputs the second guide information 79B to the second projector 59B and the third projector 59C. The second projector 59B and the third projector 59C cooperate with each other to project the second guide information 79B onto the floor surface 32 of the radiography room 25 extending from the second door 57 to a space between the upright imaging table 12 and the radiation source 16.

The second guide information 79B includes an arrow 105, a message 106, and a foot print 107. The arrow 105 indicates a movement route from the second door 57 to the standby position of the subject H. The standby position is a predetermined position between the upright imaging table 12 and the radiation source 16, and is a position at which the subject H does not interfere with the adjustment of the height positions of the radiation source 16 and the holder 37. The message 106 is a sentence to urge the subject H to move to the standby position and stand at the foot print 107. The foot print 107 clearly indicates the standby position and serves as marks on which the subject H places both feet.

In a case in which it is recognized by the subject position information 95 from the image analysis unit 92 that the subject H stands at the standby position, that is, the progress status of the radiography is "standby", the status recognition unit 93 outputs to the projector controller 94 that the progress status is "standby". In a case in which the status recognition unit 93 inputs that the progress status is "standby", the projector controller 94 causes the second projector 59B and the third projector 59C to stop the projection of the second guide information 79B. That is, the second projector 59B and the third projector 59C continue the projection of the second guide information 79B until the subject H moves from the second door 57 and stands at the standby position.

Figure 9:
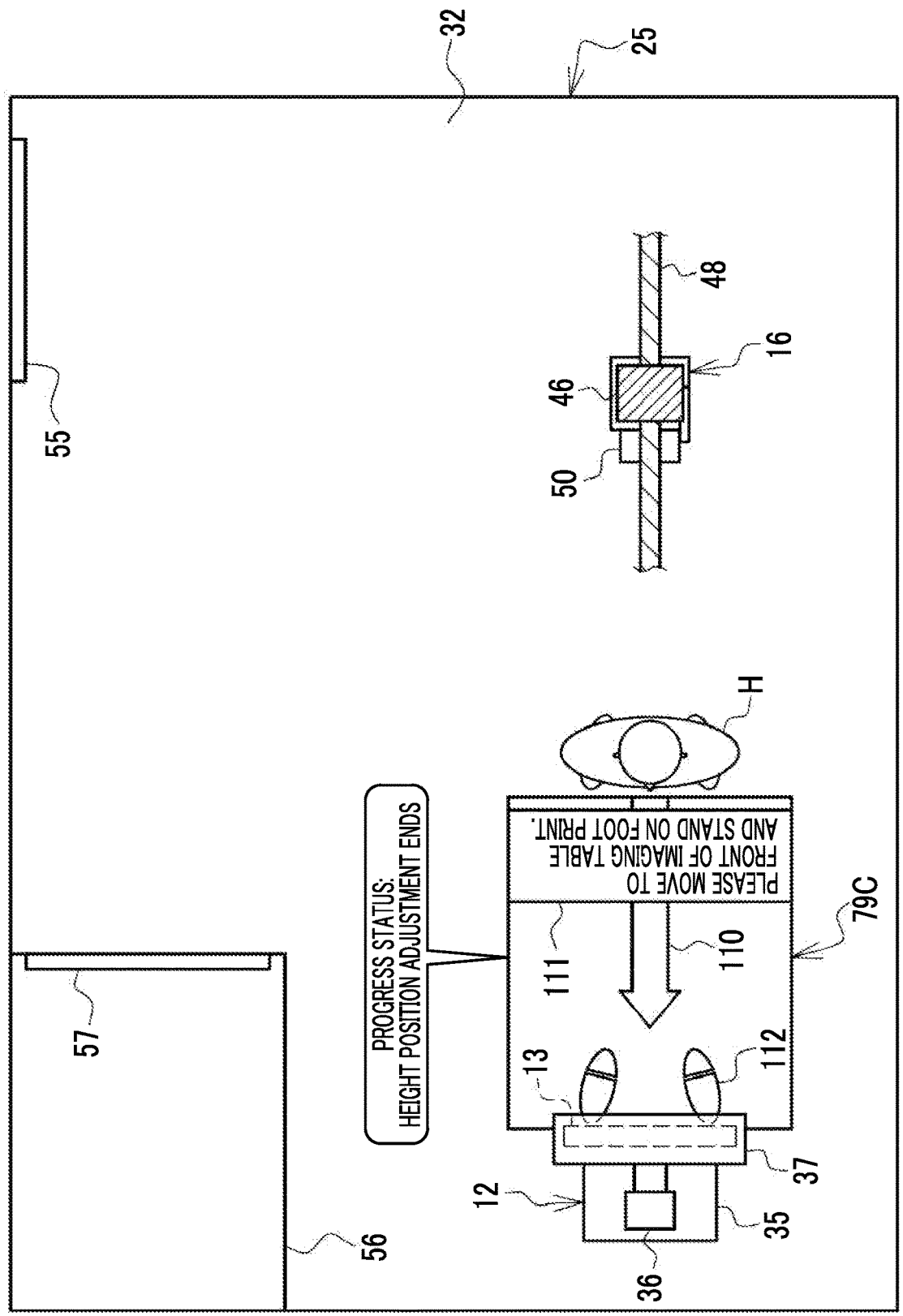
FIG. 9 is a diagram showing third guide information projected onto the floor surface of the radiography room in a case in which the progress status of the radiography is "height position adjustment ends"

FIG. 9 shows a case in which the adjustment end signal 96 is input via the input device 41 by the operator OP and the status recognition unit 93 recognizes that the adjustment of the height positions of the radiation source 16 and the holder 37 ends, that is, the progress status of the radiography is "height position adjustment ends". In this case, the status recognition unit 93 reads out the third guide information 79C from the storage 65 and outputs the third guide information 79C to the projector controller 94. The projector controller 94 outputs the third guide information 79C to the third projector 59C. The third projector 59C projects the third guide information 79C onto a portion of the floor surface 32 of the radiography room 25 extending from the standby position to an imaging position in immediately front of the upright imaging table 12. The imaging position is a standing position of the subject H recommended in the chest portion upright front surface imaging.

The third guide information 79C includes an arrow 110, a message 111, and a foot print 112. The arrow 110 indicates a movement route from the standby position to the imaging position in immediately front of the upright imaging table 12. The message 111 is a sentence to urge the subject H to move to the imaging position and stand at the foot print 112. The foot print 112 clearly indicates the imaging position and serves as marks on which the subject H places both feet.

Figure 10:
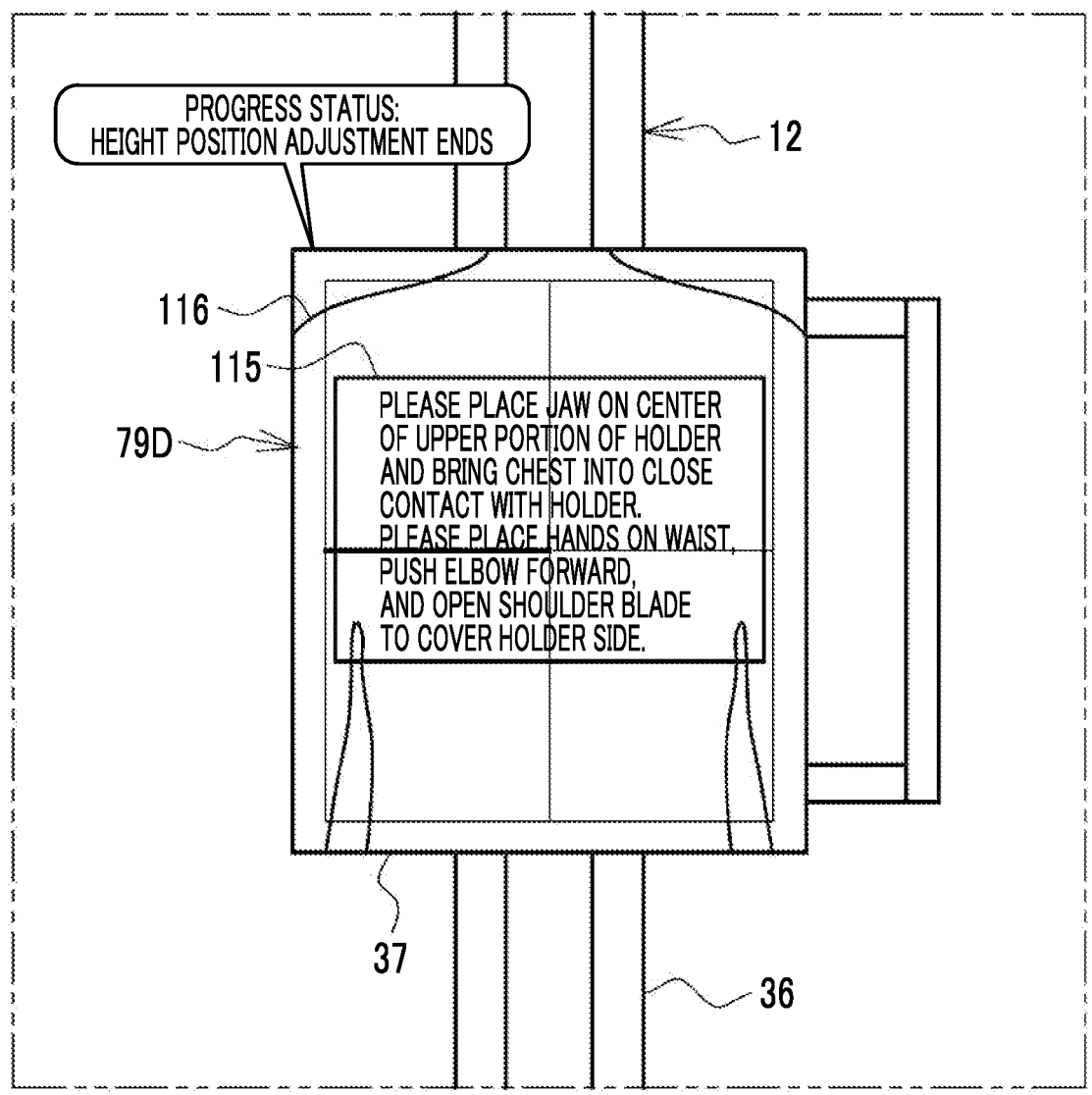
FIG. 10 is a diagram showing fourth guide information projected onto a holder of an upright imaging table in a case in which the progress status of the radiography is "height position adjustment ends"

In addition, in a case in which it is recognized that the progress status of the radiography is "height position adjustment ends", the status recognition unit 93 reads out the fourth guide information 79D from the storage 65 and outputs the fourth guide information 79D to the projector controller 94. The projector controller 94 outputs the fourth guide information 79D to the fourth projector 59D. As shown in FIG. 10 as an example, the fourth projector 59D projects the fourth guide information 79D onto the holder 37. In this case the fourth projector 59D matches the projection position of the fourth guide information 79D with the height position of the holder 37 based on the height position information 77.

The fourth guide information 79D includes a message 115 and a human print 116. The message 115 is sentences to urge the subject H to place the jaw on the center of the upper portion of the holder 37, place the hands on waist and push the elbow forward, open the shoulder blade to cover the holder 37 side, and bring the chest portion into close contact with the holder 37. The human print 116 indicates ideal position and posture of the subject H with respect to the holder 37.

In a case in which it is recognized by the subject position information 95 from the image analysis unit 92 that the subject H stands at the imaging position, that is, the progress status of the radiography is "preparation for the imaging is completed", the status recognition unit 93 outputs to the projector controller 94 that the progress status is "preparation for the imaging is completed". In a case in which the status recognition unit 93 inputs that the progress status is "preparation for the imaging is completed", the projector controller 94 causes the third projector 59C to stop the projection of the third guide information 79C. In addition, in a case in which the status recognition unit 93 inputs that the progress status is "preparation for the imaging is completed", the projector controller 94 causes the fourth projector 59D to stop the projection of the fourth guide information 79D. That is, the third projector 59C and the fourth projector 59D continue the projection of the third guide information 79C and the fourth guide information 79D until the subject H moves from the standby position and stands at the imaging position.

Figure 11:
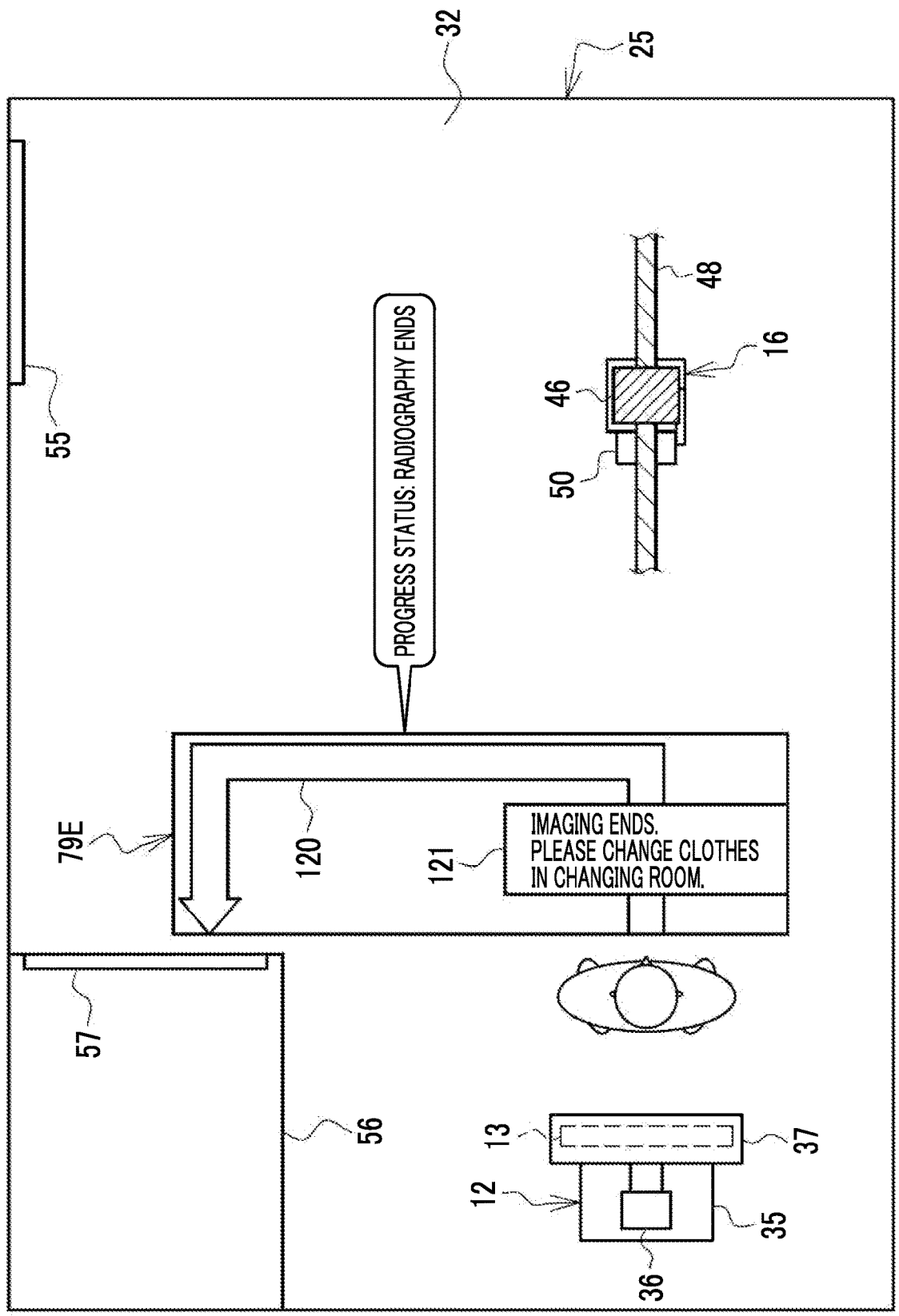
FIG. 11 is a diagram showing fifth guide information projected onto the floor surface of the radiography room in a case in which the progress status of the radiography is "radiography ends"

FIG. 11 shows a case in which the status recognition unit 93 recognizes, by the irradiation end signal 97 from the radiation source control device 17, that the radiography ends, that is, the progress status of the radiography is "radiography ends". In this case, the status recognition unit 93 reads out the fifth guide information 79E from the storage 65 and outputs the fifth guide information 79E to the projector controller 94. The projector controller 94 outputs the fifth guide information 79E to the second projector 59B and the third projector 59C. The second projector 59B and the third projector 59C cooperate with each other to project the fifth guide information 79E onto a portion of the floor surface 32 of the radiography room 25 extending from a position in front of the upright imaging table 12 to the changing room 56.

The fifth guide information 79E includes an arrow 120 and a message 121. The arrow 120 indicates a movement route from the position in front of the upright imaging table 12 to the second door 57 of the changing room 56. The message 121 is sentences indicating that the radiography ends and to urge the subject H to change to his/her clothes in the changing room 56.

In a case in which it is recognized by the subject position information 95 from the image analysis unit 92 that the subject H enters the changing room 56 from the second door 57, that is, the progress status of the radiography is "entering the changing room", the status recognition unit 93 outputs to the projector controller 94 that the progress status is "entering the changing room". In a case in which the status recognition unit 93 inputs that the progress status is "entering the changing room", the projector controller 94 stops the projection of the fifth guide information 79E on the second projector 59B and the third projector 59C. That is, the second projector 59B and the third projector 59C continue the projection of the fifth guide information 79E until the subject H moves from the position in front of the upright imaging table 12 and enters the changing room 56.

FIG. 12 shows a case in which the status recognition unit 93 recognizes, by the subject position information 95 from the image analysis unit 92, that the subject H is in the vicinity of the second door 57 and returns from the changing room 56 to the radiography room 25 via the second door 57 after changing clothes ends, that is, the progress status of the radiography is "changing clothes ends (after the radiography)". In this case, the status recognition unit 93 reads out the sixth guide information 79F from the storage 65 and outputs the sixth guide information 79F to the projector controller 94. The projector controller 94 outputs the sixth guide information 79F to the first projector 59A and the second projector 59B. The first projector 59A and the second projector 59B cooperate with each other to project the sixth guide information 79F onto a portion of the floor surface 32 of the radiography room 25 extending from the changing room 56 to the first door 55.

The sixth guide information 79F includes an arrow 125 and a message 126. The arrow 125 indicates a movement route from the second door 57 of the changing room 56 to the first door 55. The message 126 is sentences to urge the subject H to leave the radiography room 25.

In a case in which it is recognized by the subject position information 95 from the image analysis unit 92 that the subject H has left the radiography room 25, that is, the progress status of the radiography is "leaving the radiography room", the status recognition unit 93 outputs to the projector controller 94 that the progress status is "leaving the radiography room". In a case in which the status recognition unit 93 inputs that the progress status is "leaving the radiography room", the projector controller 94 causes the first projector 59A and the second projector 59B to stop the projection of the sixth guide information 79F. That is, the first projector 59A and the second projector 59B continue the projection of the sixth guide information 79F until the subject H moves from the second door 57 and leaves the radiography room 25.

As an example, Table 130 shown in FIG. 13 summarizes the progress status of the radiography, the guide information 79, the projection surface, and the operating projector 59 shown in FIGS. 7 to 12. That is, first, in a case in which the progress status of the radiography is "entering the radiography room", as shown in FIG. 7, the first guide information 79A including the arrow 100 indicating the movement route to the changing room 56 and the message 101 to urge changing clothes in the changing room 56 is projected onto the floor surface 32 of the radiography room 25 by the first projector 59A and the second projector 59B.

In a case in which the progress status of the radiography is "changing clothes ends (before the radiography)", as shown in FIG. 8, the second guide information 79B including the arrow 105 indicating the movement route to the standby position between the upright imaging table 12 and the radiation source 16, the message 106 to urge the movement to the standby position, and the foot print 107 indicating the standing position is projected onto the floor surface 32 of the radiography room 25 by the second projector 59B and the third projector 59C.

In a case in which the progress status of the radiography is "height position adjustment ends", as shown in FIG. 9, the third guide information 79C including the arrow 110 indicating the movement route to the imaging position in immediately front of the upright imaging table 12, the message 111 to urge the movement to the imaging position, and the foot print 112 indicating the standing position is projected onto the floor surface 32 of the radiography room 25 by the third projector 59C. In addition, as shown in FIG. 10, the fourth guide information 79D including the message 115 indicating a precaution regarding the position and posture of the subject H with respect to the holder 37 and the human print 116 indicating the ideal position and posture of the subject H with respect to the holder 37 is projected onto the holder 37 by the fourth projector 59D.

In a case in which the progress status of the radiography is "radiography ends", as shown in FIG. 11, the fifth guide information 79E including the arrow 120 indicating the movement route to the changing room 56 and the message 121 to urge changing clothes in the changing room 56 is projected onto the floor surface 32 of the radiography room 25 by the second projector 59B and the third projector 59C.

In a case in which the progress status of the radiography is "changing clothes ends (after the radiography)", as shown in FIG. 12, the sixth guide information 79F including the arrow 125 indicating the movement route to the first door 55 and the message 126 to urge leaving radiography room 25 is projected onto the floor surface 32 of the radiography room 25 by the first projector 59A and the second projector 59B.

In this way, the projector controller 94 controls the projector 59 to project the guide information 79 in accordance with the progress status of the radiography onto the preset projection surface of the radiography room 25.

It should be noted that the arrows 100, 105, 110, 120, and 125 and the messages 101, 106, 111, 121, and 126 are examples of "information indicating a movement route" according to the technology of the present disclosure. In addition, the messages 106 and 111 and the foot prints 107 and 112 are examples of "information indicating a standing position" according to the technology of the present disclosure. Further, the message 115 and the human print 116 are examples of "information indicating at least any one of a position or a posture of the subject" according to the technology of the present disclosure.

Figure 14:
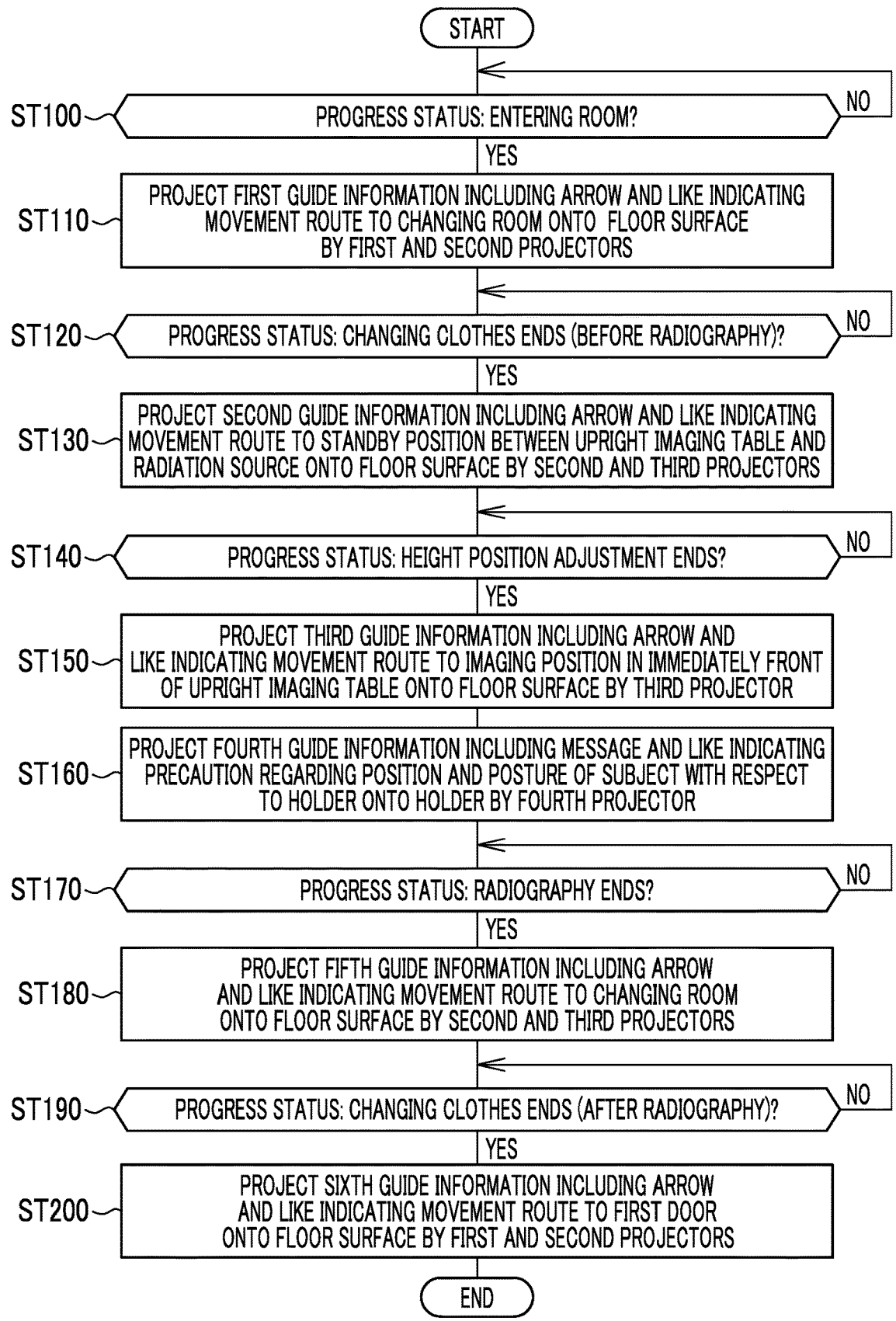
FIG. 14 is a flowchart showing a processing procedure of the console.

Next, an action with the configuration described above will be described with reference to the flowchart shown in FIG. 14 as an example. Prior to the radiography, the operator OP performs imaging preparation work. The imaging preparation work includes selection of the imaging menu 72, setting of the irradiation condition 73 of the radiation R, positioning of the electronic cassette 13 (holder 37) and the radiation source 16 (adjustment of the height position and the SID), and positioning of the subject H (adjustment of the position and the posture with respect to the electronic cassette 13 and the radiation source 16). The operator OP operates the input device 41 in the control room 26 to select the imaging menu 72 in accordance with the radiography to be performed, and then sets the irradiation condition 73 of the radiation R. Next, the operator OP transmits the announcement to the speaker 30 of the waiting room 29 through the microphone 28, and guides the subject H from the waiting room 29 to the radiography room 25.

In the console 14, the CPU 67 functions as the image acquisition unit 90, the display controller 91, the image analysis unit 92, the status recognition unit 93, and the projector controller 94 by activating the operation program 85.

The panorama of the radiography room 25 is imaged by the second camera 58, and the second optical image 78 is output from the second camera 58. The second optical image 78 is acquired by the image acquisition unit 90. The second optical image 78 is output to the image analysis unit 92 from the image acquisition unit 90.

The second optical image 78 is subjected to the image analysis by the image analysis unit 92, and the position of the subject H in the radiography room 25 is detected. The subject position information 95 indicating the detected position of the subject H in the radiography room 25 is output to the status recognition unit 93 from the image analysis unit 92.

In a case in which the status recognition unit 93 recognizes, by the subject position information 95, that the progress status of the radiography is "entering the radiography room" (YES in step ST100), the first guide information 79A is read out from the storage 65 by the status recognition unit 93 and output to the projector controller 94. Then, as shown in FIG. 7, under the control of the projector controller 94, the first projector 59A and the second projector 59B project the first guide information 79A including the arrow 100 and the like indicating the movement route to the changing room 56 onto the floor surface 32 of the radiography room 25 (step ST110). The subject H visually recognizes the first guide information 79A, walks along the arrow 100 to reach the second door 57, enters the changing room 56 from the second door 57, and changes clothes to the examination clothes. In some cases, the subject H removes metal, such as a ring or a wristwatch.

In a case in which the status recognition unit 93 recognizes, by the subject position information 95, that the progress status of the radiography is "changing clothes ends (before the radiography)" (YES in step ST120), the second guide information 79B is read out from the storage 65 by the status recognition unit 93 and output to the projector controller 94. Then, as shown in FIG. 8, under the control of the projector controller 94, the second projector 59B and the third projector 59C project the second guide information 79B including the arrow 105 and the like indicating the movement route to the standby position between the upright imaging table 12 and the radiation source 16 onto the floor surface 32 of the radiography room 25 (step ST130). The subject H visually recognizes the second guide information 79B, walks along the arrow 105 to reach the standby position, and stands with both feet placed on the foot print 107.

The operator OP operates the input device 41 to input the imaging instruction to the first camera 20. As a result, the imaging instruction is transmitted from the console 14 to the first camera 20, and the imaging of the first optical image 52 is started by the first camera 20. The first optical image 52 is acquired by the image acquisition unit 90. The first optical image 52 is output to the display controller 91 from the image acquisition unit 90. The first optical image 52 is displayed on the display 40 by the display controller 91.

The operator OP grasps a height of the subject H from the first optical image 52 displayed on the display 40, operates the input device 41 in accordance with the grasped height, moves the holder 37 and thus the electronic cassette 13 up and down, and then adjusts the height position of the electronic cassette 13. In addition, the operator OP operates the input device 41 to move the radiation source 16 up and down to move the radiation source 16 to the height position corresponding to the height position of the electronic cassette 13. Further, the operator OP operates the input device 41 to move the radiation source 16 in parallel along the rail 48, and moves the radiation source 16 to the position of the SID corresponding to the selected imaging menu 72, in this case, the "chest portion, upright, front surface". The holder 37 is positioned at a preset home position before the height position is adjusted. Similarly, the radiation source 16 is positioned at a preset home position before the height position and a horizontal position are adjusted. It should be noted that an indicator indicating the height may be installed in the field of view FOV of the first optical image 52, such as the support column 36 of the upright imaging table 12 or a wall surface 142 (see FIG. 17) of the radiography room 25 in the vicinity of the upright imaging table 12, and the operator OP may be made to recognize the scale of the indicator shown in the first optical image 52. In addition, the height of the subject H may be estimated by performing the image analysis on the first optical image 52, and the height positions of the electronic cassette 13 and the radiation source 16 may be automatically adjusted in accordance with the estimated height.

After the adjustment of the height positions of the electronic cassette 13 and the radiation source 16 ends, the operator OP operates the input device 41 to input the adjustment end signal 96. The adjustment end signal 96 is acquired by the status recognition unit 93. In addition, the height position information 77 from the upright imaging table 12 in this case is input to the projector controller 94.

In a case in which the status recognition unit 93 recognizes, by the adjustment end signal 96, that the progress status of the radiography is "height position adjustment ends" (YES in step ST140), the third guide information 79C is read out from the storage 65 by the status recognition unit 93 and output to the projector controller 94. Then, as shown in FIG. 9, under the control of the projector controller 94, the third projector 59C projects the third guide information 79C including the arrow 110 and the like indicating the movement route to the imaging position in immediately front of the upright imaging table 12 onto the floor surface 32 of the radiography room 25 (step ST150). The subject H visually recognizes the third guide information 79C, walks along the arrow 110 to reach the imaging position, and stands with both feet placed on the foot print 112.

In addition, the status recognition unit 93 reads out the fourth guide information 79D from the storage 65 and outputs the fourth guide information 79D to the projector controller 94. Then, as shown in FIG. 10, under the control of the projector controller 94, the fourth projector 59D projects the fourth guide information 79D including the message 115 and the like indicating the precaution regarding the position and the posture of the subject H with respect to the holder 37 onto the holder 37 (step ST160). The subject H visually recognizes the fourth guide information 79D, and adjusts the position and the posture of the subject H to fit the human print 116 in accordance with the message 115. In addition, in this case, the operator OP appropriately transmits the announcement to the speaker 27 of the radiography room 25 through the microphone 28 to support the adjustment of the position and the posture of the subject H.

The operator OP transmits the announcement to the speaker 27 of the radiography room 25 through the microphone 28, and instructs the subject H to inhale and stop. Thereafter, the operator OP operates the irradiation switch 19 to instruct the radiation source 16 to start irradiation with the radiation R. As a result, the radiation R is emitted from the radiation source 16 toward the subject H.

The radiation R transmitted through the subject H reaches the electronic cassette 13. Then, the radiation R is detected as the radiation image 76 by the electronic cassette 13. The radiation image 76 is output to the console 14 from the electronic cassette 13. Then, on the console 14, various types of image processing are performed on the radiation image 76 from the electronic cassette 13. Thereafter, the radiation image 76 is displayed on the display 40.

In a case in which the irradiation with the radiation R ends, the irradiation end signal 97 is transmitted from the radiation source control device 17 to the console 14. The irradiation end signal 97 is acquired by the status recognition unit 93.

In a case in which the status recognition unit 93 recognizes, by the irradiation end signal 97, that the progress status of the radiography is "radiography ends" (YES in step ST170), the fifth guide information 79E is read out from the storage 65 by the status recognition unit 93 and output to the projector controller 94. Then, as shown in FIG. 11, under the control of the projector controller 94, the second projector 59B and the third projector 59C project the fifth guide information 79E including the arrow 120 and the like indicating the movement route to the changing room 56 onto the floor surface 32 of the radiography room 25 (step ST180). The subject H visually recognizes the fifth guide information 79E, walks along the arrow 120 to reach the second door 57, enters the changing room 56 from the second door 57, and changes clothes to his/her clothes.

In a case in which the status recognition unit 93 recognizes, by the subject position information 95, that the progress status of the radiography is "changing clothes ends (after the radiography)" (YES in step ST190), the sixth guide information 79F is read out from the storage 65 by the status recognition unit 93 and output to the projector controller 94. Then, as shown in FIG. 12, under the control of the projector controller 94, the first projector 59A and the second projector 59B project the sixth guide information 79F including the arrow 125 and the like indicating the movement route to the first door 55 onto the floor surface 32 of the radiography room 25 (step ST200). The subject H visually recognizes the sixth guide information 79F, walks along the arrow 125 to reach the first door 55, and leaves the radiography room 25 to the waiting room 29 via the first door 55.

As described above, the CPU 67 of the console 14 includes the status recognition unit 93 and the projector controller 94. The status recognition unit 93 acquires the subject position information 95, the adjustment end signal 96, and the irradiation end signal 97, which are the progress status information indicating the progress status of the radiography. The projector controller 94 performs the control of causing the projector 59 to project the guide information 79 which is related to the imaging aimed at the subject H, the guide information 79 corresponding to the progress status information, onto the preset projection surface of the radiography room 25. Therefore, the subject H can intuitively understand the guide information 79 as compared with a case in which the guide information 79 is only displayed on the monitor as disclosed in JP2011-177326A. Since the operator OP only needs to give a minimum instruction, it is possible to reduce the burden on the operator OP. In addition, since it is possible to reduce the chance of contact between the subject H and the operator OP, it is also effective as a countermeasure against infectious diseases.

The guide information 79 includes the information indicating the movement route of the subject H in the radiography room 25, and the projection surface is the floor surface 32 of the radiography room 25. Therefore, the subject H can be smoothly guided to the target positions, such as the changing room 56, the standby position, and the imaging position, without the help of the operator OP.

The guide information 79 includes the information indicating the standing position of the subject H in the radiography room 25, and the projection surface is the floor surface 32 of the radiography room 25. Therefore, the subject H can be smoothly made to stand at the target positions, such as the standby position and the imaging position, without the help of the operator OP.

The guide information 79 includes the information indicating the position and the posture of the subject H with respect to the upright imaging table 12 in which the subject H is positioned for the radiography, and the projection surface is the holder 37 of the upright imaging table 12. Therefore, it is possible to adjust the position and the posture of the subject H to the ideal position and posture without the help of the operator OP.

It should be noted that the information indicating the position and the posture of the subject H need only be information indicating at least any one of the position or the posture of the subject H. Examples of the information indicating the position of the subject H include a point indicating xiphoid process on the chest portion of the subject H. The information indicating the posture of the subject H is the message 115 and the like described as an example.

In the radiography by the radiography system 2, there is a large amount of the guide information 79, such as the position and the posture of the subject H, which is difficult for the subject to intuitively understand, as compared with the imaging by another medical image capturing system. Therefore, the effect that the subject H can intuitively understand the guide information 79 can be further exhibited by applying the technology of the present disclosure to the radiography system 2.

Modification Example

Figure 15:
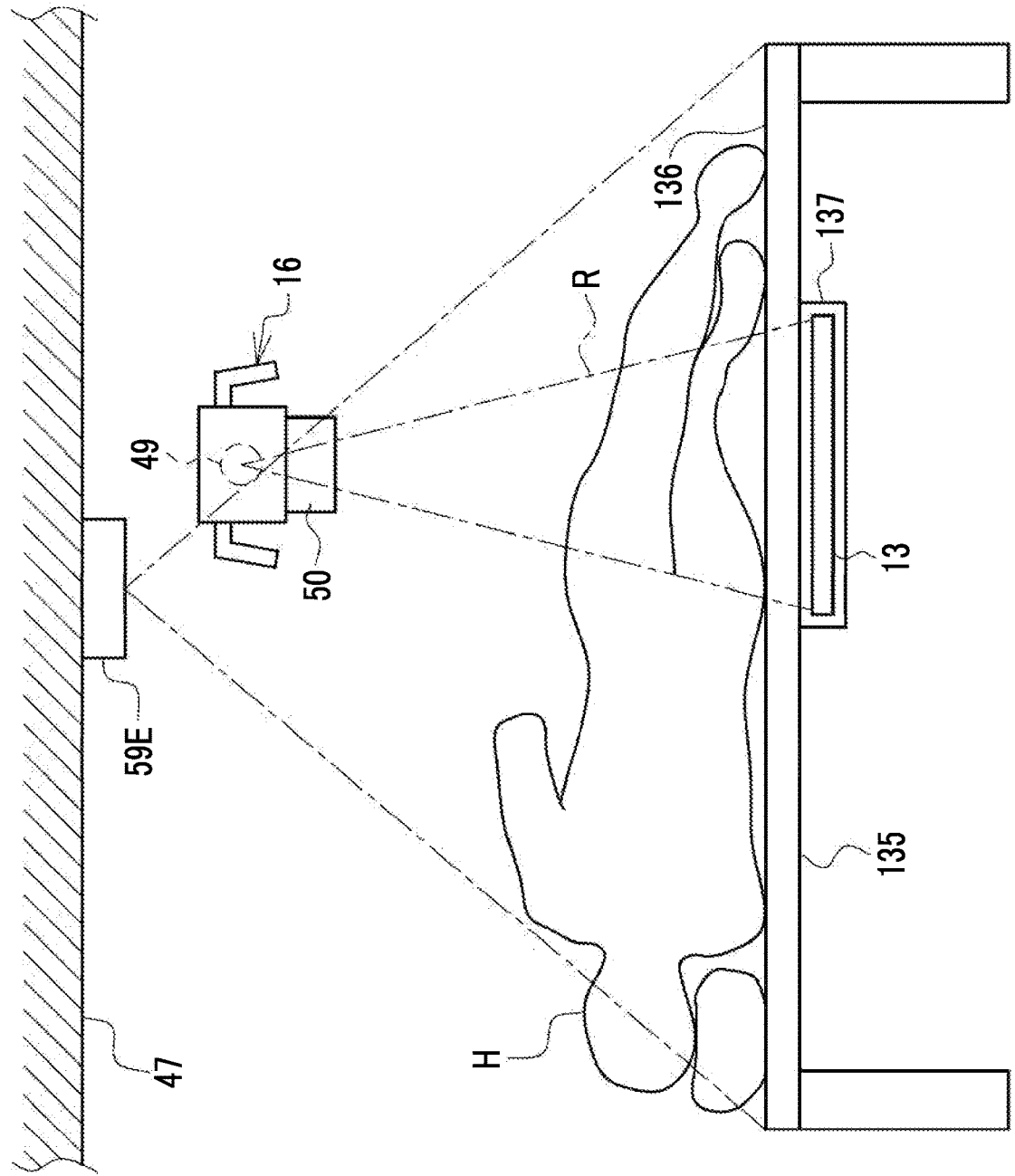
FIG. 15 is a view showing a state of knee decubitus side surface imaging.

In the first embodiment described above, the chest portion upright front surface imaging using the upright imaging table 12 has been described, but the present disclosure is not limited to this. As an example, the technology of the present disclosure may be applied to knee decubitus side surface imaging using a decubitus imaging table 135 shown in FIG. 15. In this case, the subject H lies down on his/her side on a top surface 136 of the decubitus imaging table 135 in a state in which the knee imaged by the radiography, in this case, the left knee is left down and bent. The subject H uses an auxiliary tool, such as a cushion and/or a table, as necessary in order to maintain the posture.

The decubitus imaging table 135 is installed in the radiography room 25 together with the upright imaging table 12 and the like. The decubitus imaging table 135 includes a holder 137 that holds the electronic cassette 13 inside. The holder 137 can be moved in parallel along a long side of the decubitus imaging table 135.

Figure 16:
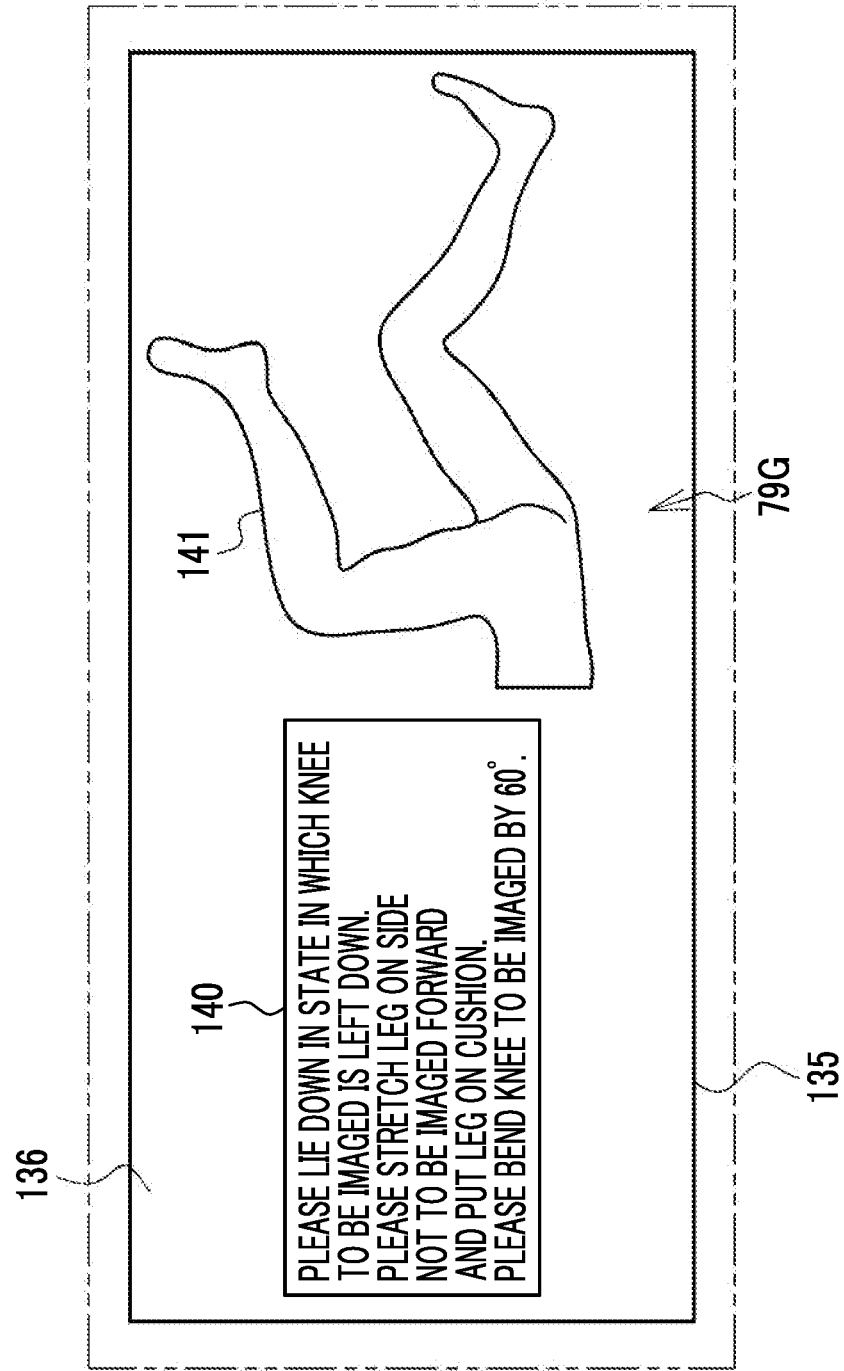
FIG. 16 is a diagram showing seventh guide information projected onto a decubitus imaging table in a case of knee decubitus side surface imaging.

A fifth projector 59E is attached on the decubitus imaging table 135 on the ceiling 47 of the radiography room 25. As shown in FIG. 16 as an example, the fifth projector 59E projects seventh guide information 79G onto the top surface 136 of the decubitus imaging table 135 under the control of the projector controller 94. The seventh guide information 79G is projected, for example, in a case in which the status recognition unit 93 recognizes that the progress status of the radiography is "changing clothes ends (before the radiography)" or in a case in which the status recognition unit 93 recognizes that the progress status of the radiography is "standby". The top surface 136 of the decubitus imaging table 135 is an example of a "projection surface" according to the technology of the present disclosure.

The seventh guide information 79G includes a message 140 and a human print 141. The message 140 is sentences to urge the subject H to lie down in a state in which the knee for the radiography is left down, stretch the leg on the side not to be imaged forward and put the leg on a cushion, and bend the knee for the radiography by 60°. The human print 141 indicates ideal position and posture of the subject H with respect to the top surface 136. The subject H visually recognizes the seventh guide information 79G, and adjusts the position and posture of the subject H to fit the human print 141 in accordance with the message 140. It should be noted that the message 140 and the human print 141 are examples of "information indicating at least any one of a position or a posture of the subject" according to the technology of the present disclosure.

As described above, the imaging table is not limited to the upright imaging table 12 and may be the decubitus imaging table 135. In addition, the projection surface on which the guide information 79 including the position and the posture information of the subject H is projected is not limited to the holder 37 of the upright imaging table 12, and may be the top surface 136 of the decubitus imaging table 135. It should be noted that the guide information 79 in a case of the decubitus imaging table 135 is not limited to the seventh guide information 79G described as an example. For example, the guide information 79 and the like indicating the movement route from the second door 57 to the decubitus imaging table 135 are also included.

Figure 17:
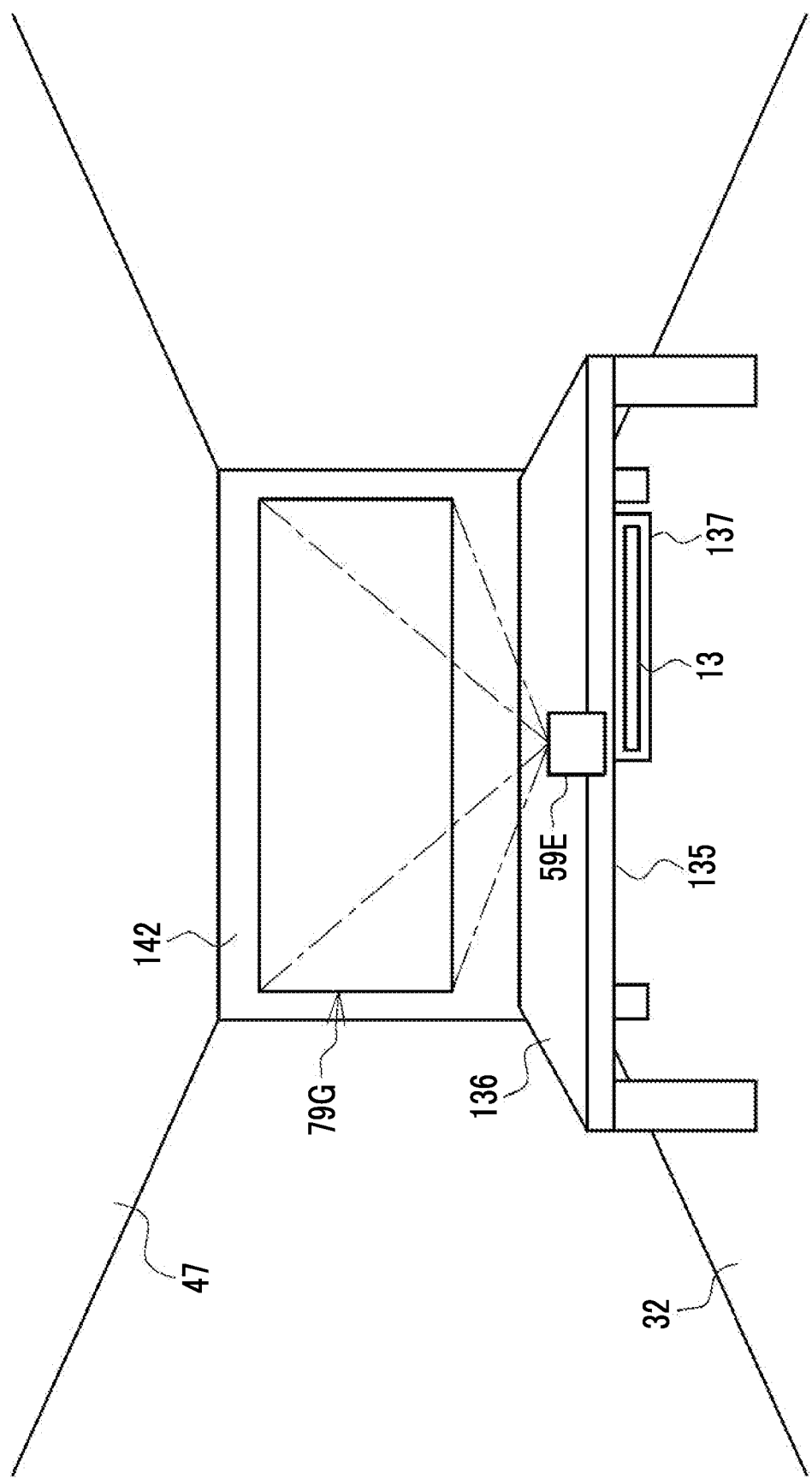
FIG. 17 is a diagram showing an example of displaying the guide information on a wall surface of the radiography room around the decubitus imaging table.
Figure 18:
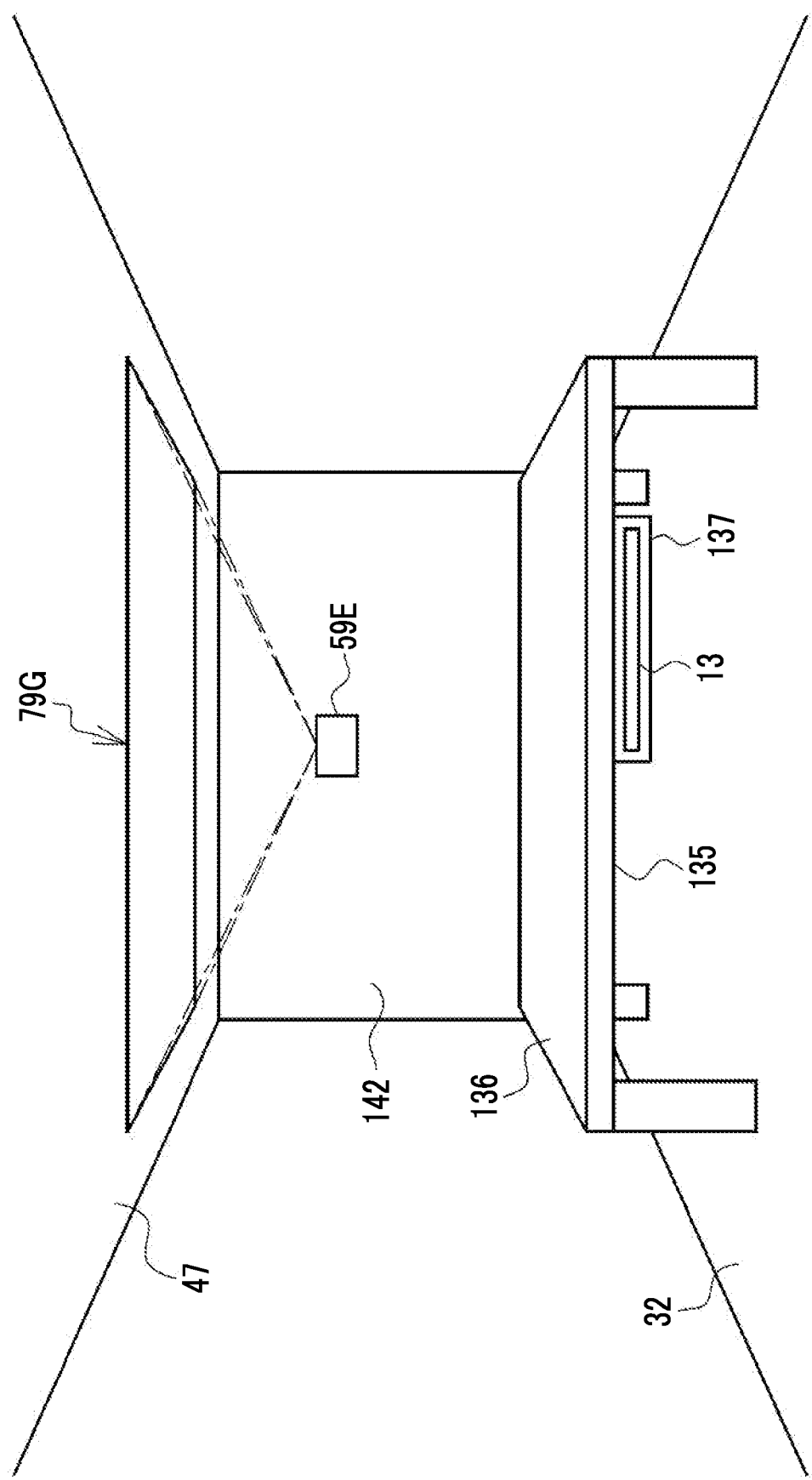
FIG. 18 is a diagram showing an example of displaying the guide information on a ceiling of the radiography room over the decubitus imaging table.

As an example, as shown in FIG. 17, the fifth projector 59E may be attached to the decubitus imaging table 135 and the seventh guide information 79G may be projected onto the wall surface 142 of the radiography room 25 around the decubitus imaging table 135. In this case, the wall surface 142 is an example of a "projection surface" according to the technology of the present disclosure. In addition, as shown in FIG. 18 as an example, the fifth projector 59E may be attached to the wall surface 142 of the radiography room 25, and the seventh guide information 79G may be projected onto the ceiling 47 of the radiography room 25 on the decubitus imaging table 135. In this case, the ceiling 47 is an example of a "projection surface" according to the technology of the present disclosure. According to the aspects shown in FIGS. 17 and 18, the subject H can visually recognize the seventh guide information 79G in a state of lying down on the top surface 136 of the decubitus imaging table 135.

As described above, an installation location of the projector 59 is not limited to the ceiling 47 of the radiography room 25, and may be the decubitus imaging table 135 or may be the wall surface 142 of the radiography room 25. In addition, the projector 59 may be installed at the floor surface 32 of the radiography room 25. It should be noted that, in a case of the upright imaging table 12, the guide information 79 may be projected onto the wall surface 142 of the radiography room 25 around the upright imaging table 12.

Second Embodiment

Figure 19:
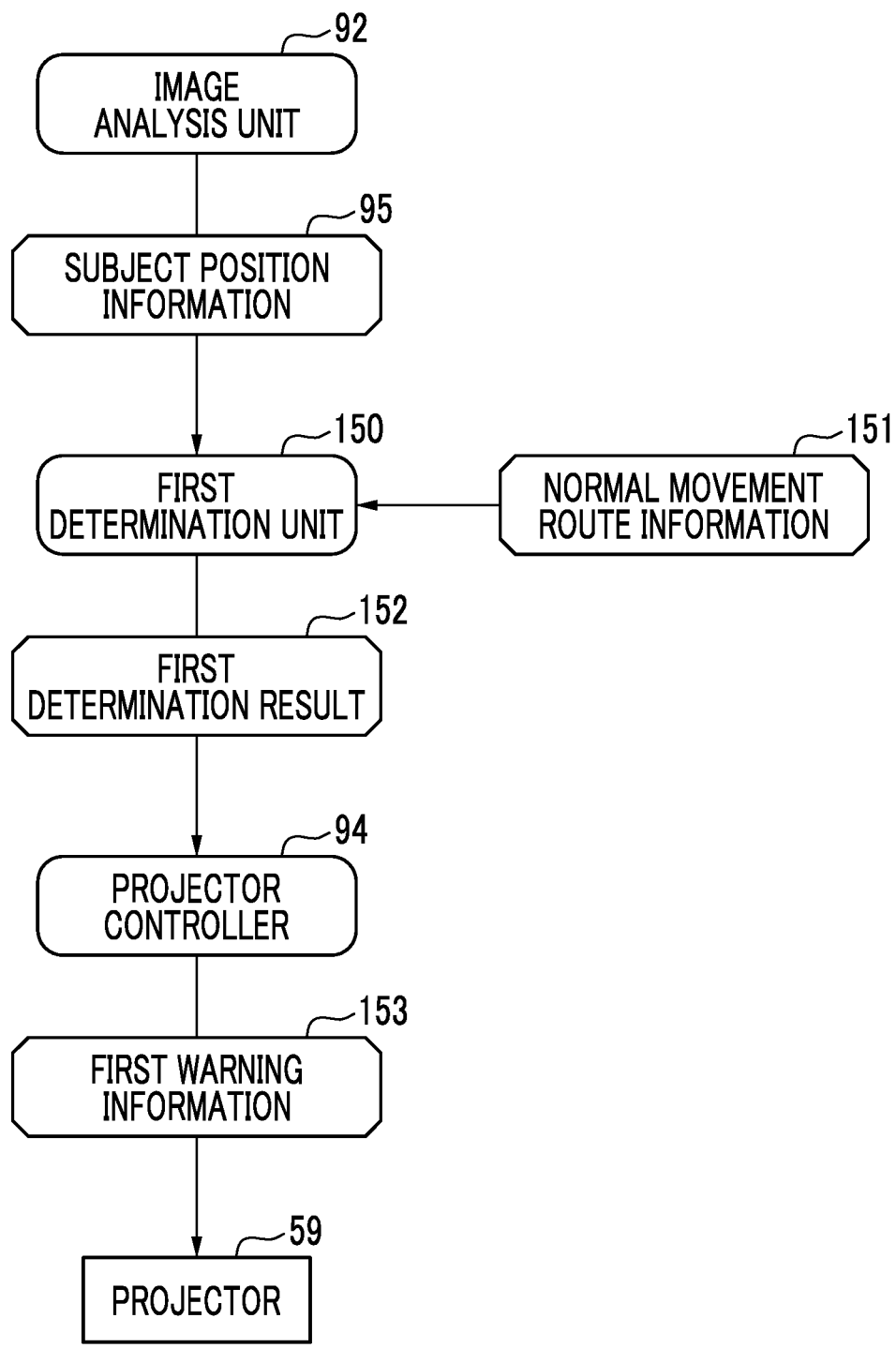
FIG. 19 is a diagram showing a second embodiment in which a warning is output in a case in which a position of a subject deviates from a movement route.

As shown in FIG. 19 as an example, the CPU 67 of the console 14 according to the second embodiment functions as a first determination unit 150, in addition to the processing units 90 to 94 according to the first embodiment (not shown except for the image analysis unit 92 and the projector controller 94).

The subject position information 95 from the image analysis unit 92 is input to the first determination unit 150. In addition, normal movement route information 151 is input to the first determination unit 150. The normal movement route information 151 is stored in the storage 65. The normal movement route information 151 is information indicating a range of each of the movement route from the first door 55 to the second door 57 of the changing room 56, the movement route from the second door 57 to the standby position of the subject H, the movement route from the standby position to the imaging position in immediately front of the upright imaging table 12, and the movement route from the position in front of the upright imaging table 12 to the second door 57 of the changing room 56.

The first determination unit 150 determines whether or not the position of the subject H indicated by the subject position information 95 is included in the range of the movement route indicated by the normal movement route information 151. In a case in which the position of the subject H is included in the range of the movement route, the first determination unit 150 determines that the subject H does not deviate from the movement route, and outputs a first determination result 152 to that effect to the projector controller 94 (see FIG. 21). On the other hand, in a case in which the position of the subject H is not included in the range of the movement route, the first determination unit 150 determines that the subject H deviates from the movement route, and outputs the first determination result 152 to that effect to the projector controller 94 (see FIG. 22). For example, in a case in which larger than half of the subject H is not included in the range of the movement route, the first determination unit 150 determines that the subject H deviates from the movement route.

In a case in which the first determination result 152 indicates a content that the subject H does not deviate from the movement route, the projector controller 94 does nothing. On the other hand, in a case in which the first determination result 152 indicates a content that the subject H deviates from the movement route, the projector controller 94 outputs first warning information 153 to the projector 59.

FIG. 20 to FIG. 23 show a case in which the progress status of the radiography is "entering the radiography room" and the subject H walks on the movement route from the first door 55 to the second door 57 of the changing room 56. It should be noted that, in FIG. 20 to FIG. 22, the first guide information 79A is not shown in order to avoid complication.

Figure 20:
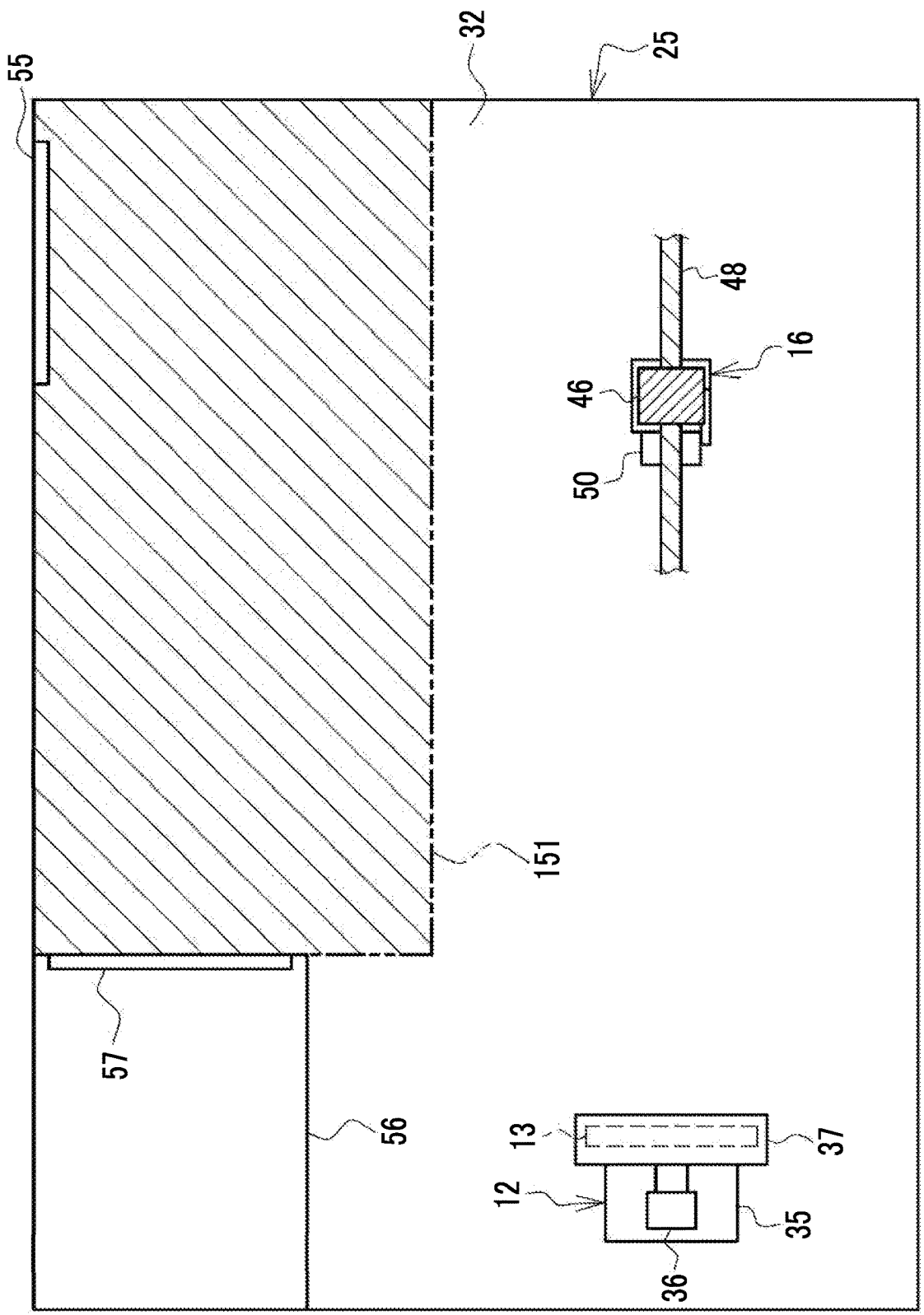
FIG. 20 is a diagram showing normal movement route information.
Figure 21:
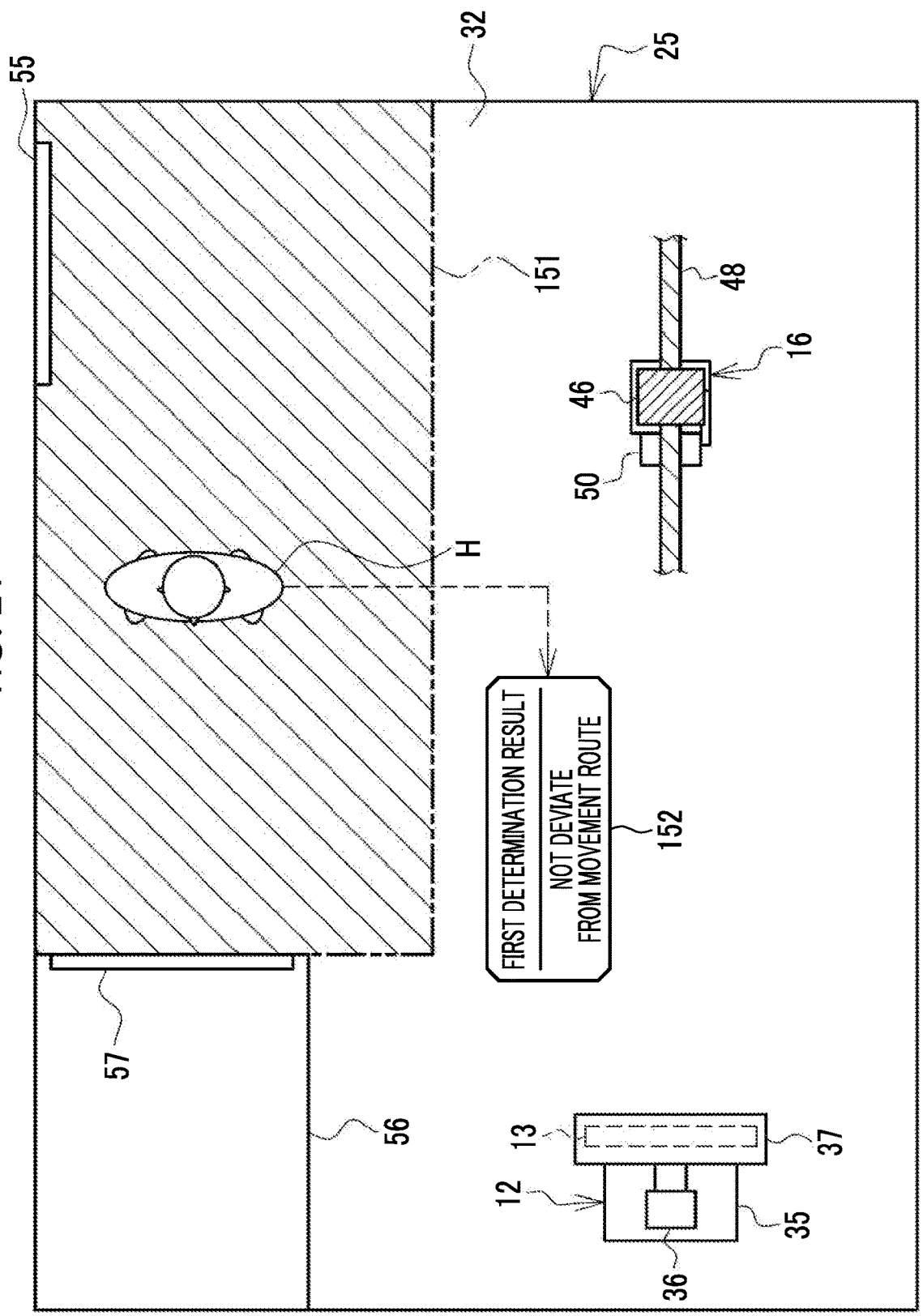
FIG. 21 is a diagram showing a case in which the position of the subject does not deviate from the movement route.
Figure 22:
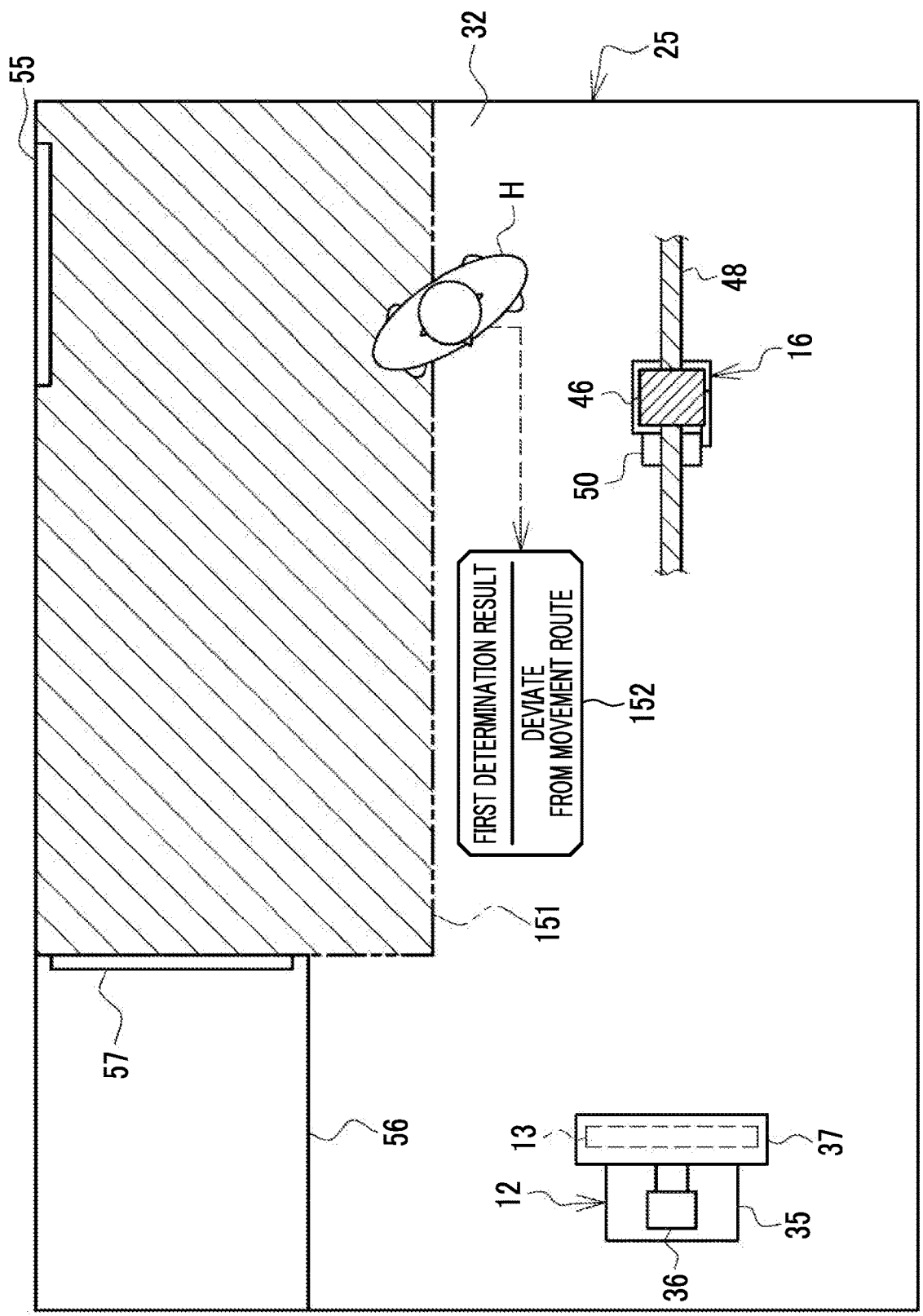
FIG. 22 is a diagram showing a case in which the position of the subject deviates from the movement route.

In FIGS. 20 to 22, the normal movement route information 151 indicating the range of the movement route from the first door 55 to the second door 57 of the changing room 56 is indicated by a double-dot chain line and hatching. In this case, the normal movement route information 151 indicates a rectangular range in which a margin for one person is provided on the upright imaging table 12 and the radiation source 16 side, in addition to a portion of the floor surface 32 of the radiography room 25 extending from the first door 55 to the second door 57 of the changing room 56.

FIG. 21 shows a case in which the position of the subject H indicated by the subject position information 95 is included in the range of the movement route indicated by the normal movement route information 151 and the first determination unit 150 outputs the first determination result 152 indicating the content that the subject H does not deviate from the movement route. In this case, only the first guide information 79A shown in FIG. 7 is projected onto the floor surface 32 of the radiography room 25.

Figure 23:
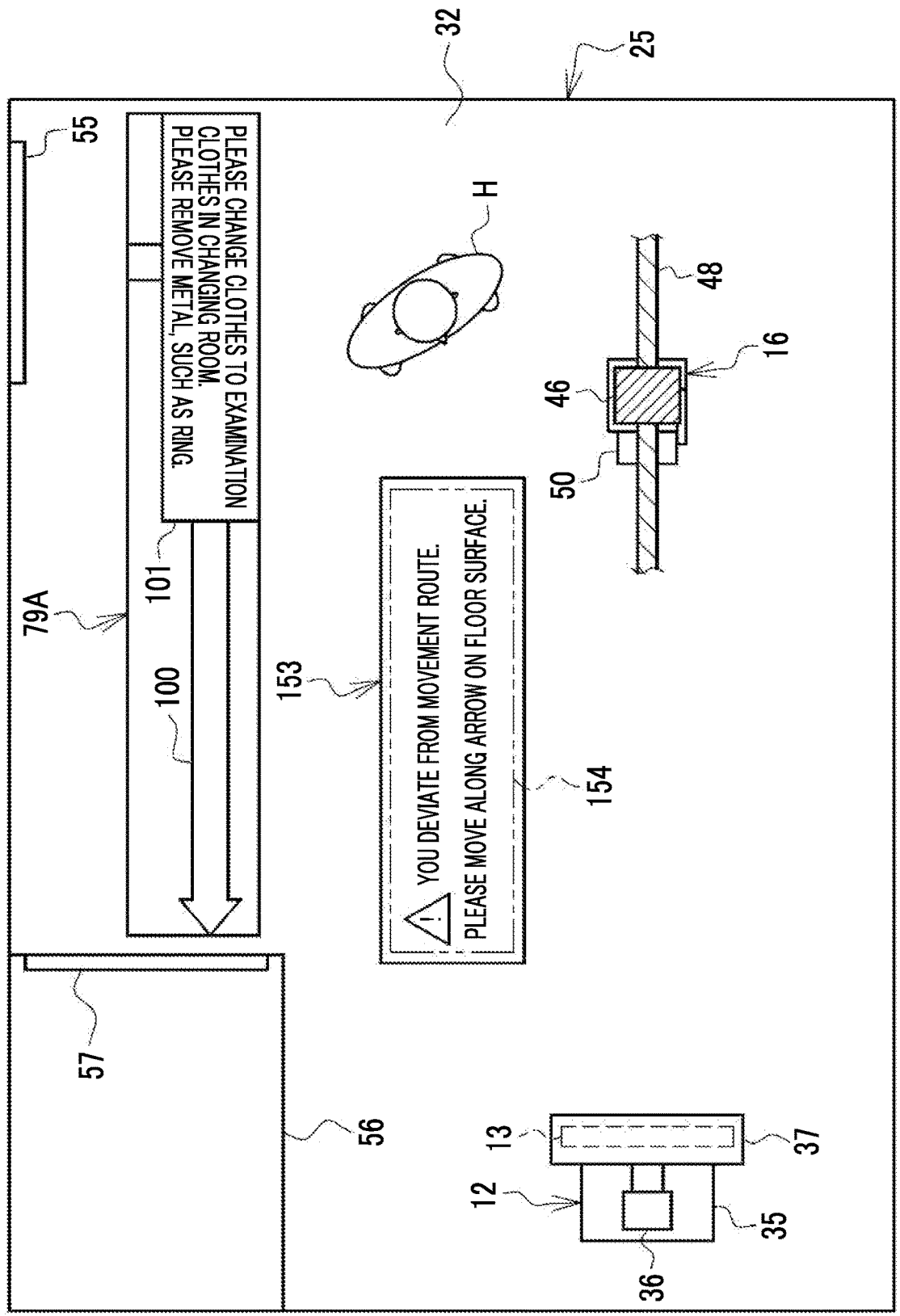
FIG. 23 is a diagram showing first warning information projected onto the floor surface of the radiography room in a case in which the position of the subject deviates from the movement route.

On the other hand, FIG. 22 shows a case in which the position of the subject H indicated by the subject position information 95 is not included in the range of the movement route indicated by the normal movement route information 151 and the first determination unit 150 outputs the first determination result 152 indicating the content that the subject H deviates from the movement route. In this case, as shown in FIG. 23 as an example, the first warning information 153 is projected onto the floor surface 32 of the radiography room 25, in addition to the first guide information 79A. The first warning information 153 is a message 154 consisting of sentences for notifying the subject H that the subject H deviates from the movement route and urging the subject H to move along the arrow 100. The first warning information 153 is projected onto a central portion of the floor surface 32 of the radiography room 25, for example, by the third projector 59C. It should be noted that, in addition to the movement route from the first door 55 to the second door 57 of the changing room 56 shown in FIGS. 20 to 23, the normal movement route information 151 is similarly set for other movement routes, and the first warning information 153 is projected onto the floor surface 32 of the radiography room 25 in a case in which the first determination result 152 indicates the content that the subject H deviates from the movement route.

As described above, in the second embodiment, the first determination unit 150 acquires the subject position information 95 indicating the position of the subject H in the radiography room 25. The projector controller 94 outputs the first warning information 153 to the projector 59 in a case in which the position of the subject H indicated by the subject position information 95 deviates from the movement route. Therefore, as compared with a case in which only the guide information 79 is provided, it is possible to strongly urge the subject H to walk along the movement route. In addition, as compared with a case in which only the guide information 79 is provided, it is possible to surely reduce the probability that the subject H walks in a wrong direction, such as going toward the decubitus imaging table 135 instead of the upright imaging table 12. Further, it is possible to reduce a concern that the subject H is hit by an unexpected happening, such as the subject H colliding with the radiation source 16.

Third Embodiment

Figure 24:
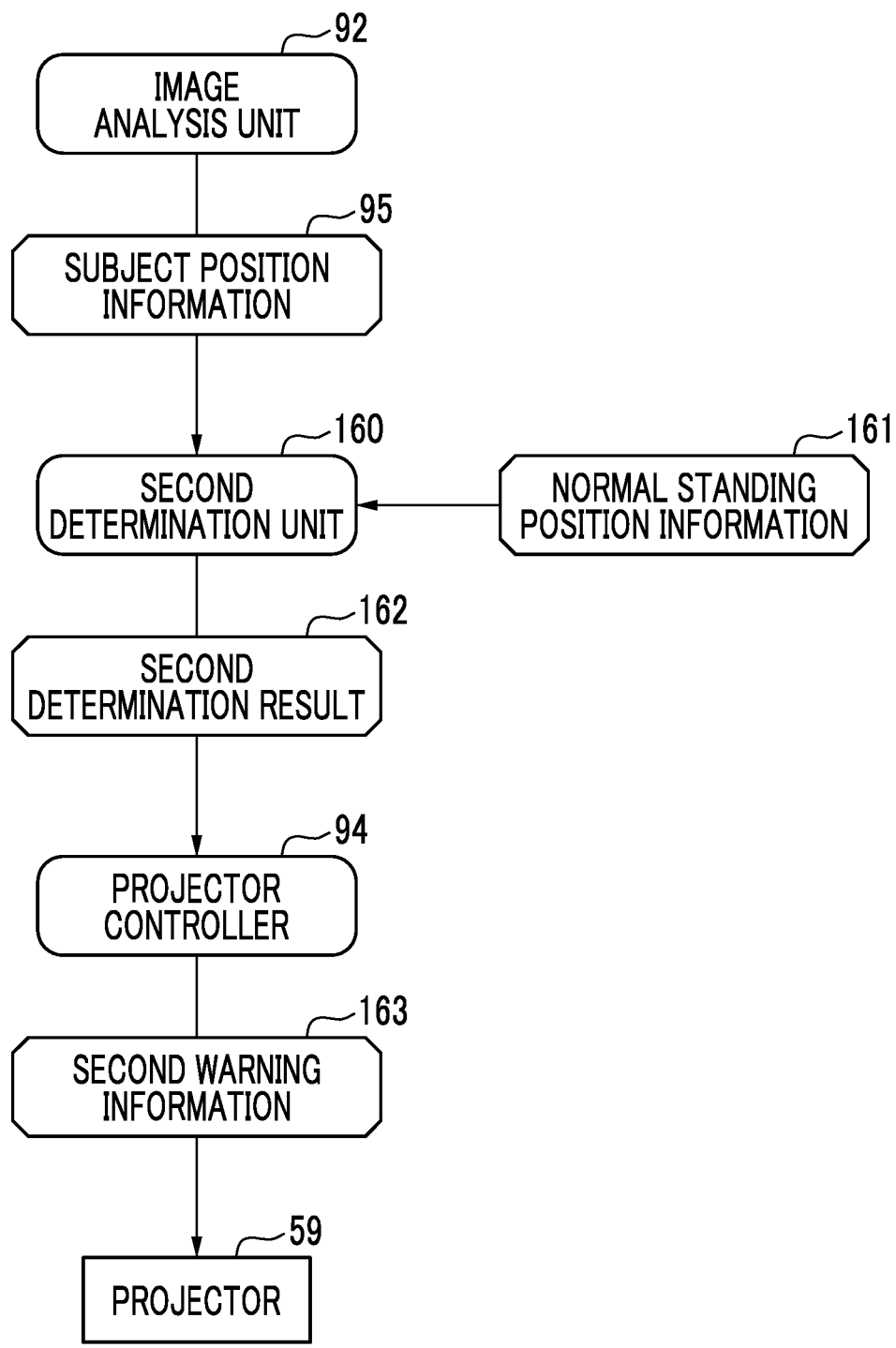
FIG. 24 is a diagram showing a third embodiment in which a warning is output in a case in which the position of the subject deviates from a standing position.

As an example, as shown in FIG. 24, the CPU 67 of the console 14 according to the third embodiment functions as a second determination unit 160, in addition to the processing units 90 to 94 according to the first embodiment (not shown except for the image analysis unit 92 and the projector controller 94).

The subject position information 95 from the image analysis unit 92 is input to the second determination unit 160. In addition, normal standing position information 161 is input to the second determination unit 160. The normal standing position information 161 is stored in the storage 65. The normal standing position information 161 is information indicating a range of each of the standing position of the standby position and the standing position of the imaging position.

The second determination unit 160 determines whether or not the position of the subject H indicated by the subject position information 95 is included in the range of the standing position indicated by the normal standing position information 161. In a case in which the position of the subject H is included in the range of the standing position, the second determination unit 160 determines that the subject H does not deviate from the standing position, and outputs a second determination result 162 to that effect to the projector controller 94 (see FIG. 26). On the other hand, in a case in which the position of the subject H is not included in the range of the standing position, the second determination unit 160 determines that the subject H deviates from the standing position, and outputs the second determination result 162 to that effect to the projector controller 94 (see FIG. 27). For example, in a case in which larger than half of the subject H is not included in the range of the standing position, the second determination unit 160 determines that the subject H deviates from the standing position. A timing at which the second determination unit 160 determines whether or not the position of the subject H is included in the range of the standing position of the standby position is after a preset time has elapsed since the status recognition unit 93 recognizes that the progress status of the radiography is "changing clothes ends (before the radiography)". In addition, a timing at which the second determination unit 160 determines whether or not the position of the subject H is included in the range of the standing position of the imaging position is after a preset time has elapsed since the status recognition unit 93 recognizes that the progress status of the radiography is "height position adjustment ends".

In a case in which the second determination result 162 indicates a content that the subject H does not deviate from the standing position, the projector controller 94 does nothing. On the other hand, in a case in which the second determination result 162 indicates a content that the subject H deviates from the standing position, the projector controller 94 outputs second warning information 163 to the projector 59.

FIG. 25 to FIG. 28 show a case in which the progress status of the radiography is "changing clothes ends (before the radiography)" and the subject H moves from the second door 57 of the changing room 56 to the standby position. It should be noted that, in FIG. 25 to FIG. 27, the second guide information 79B is not shown in order to avoid complication.

Figure 25:
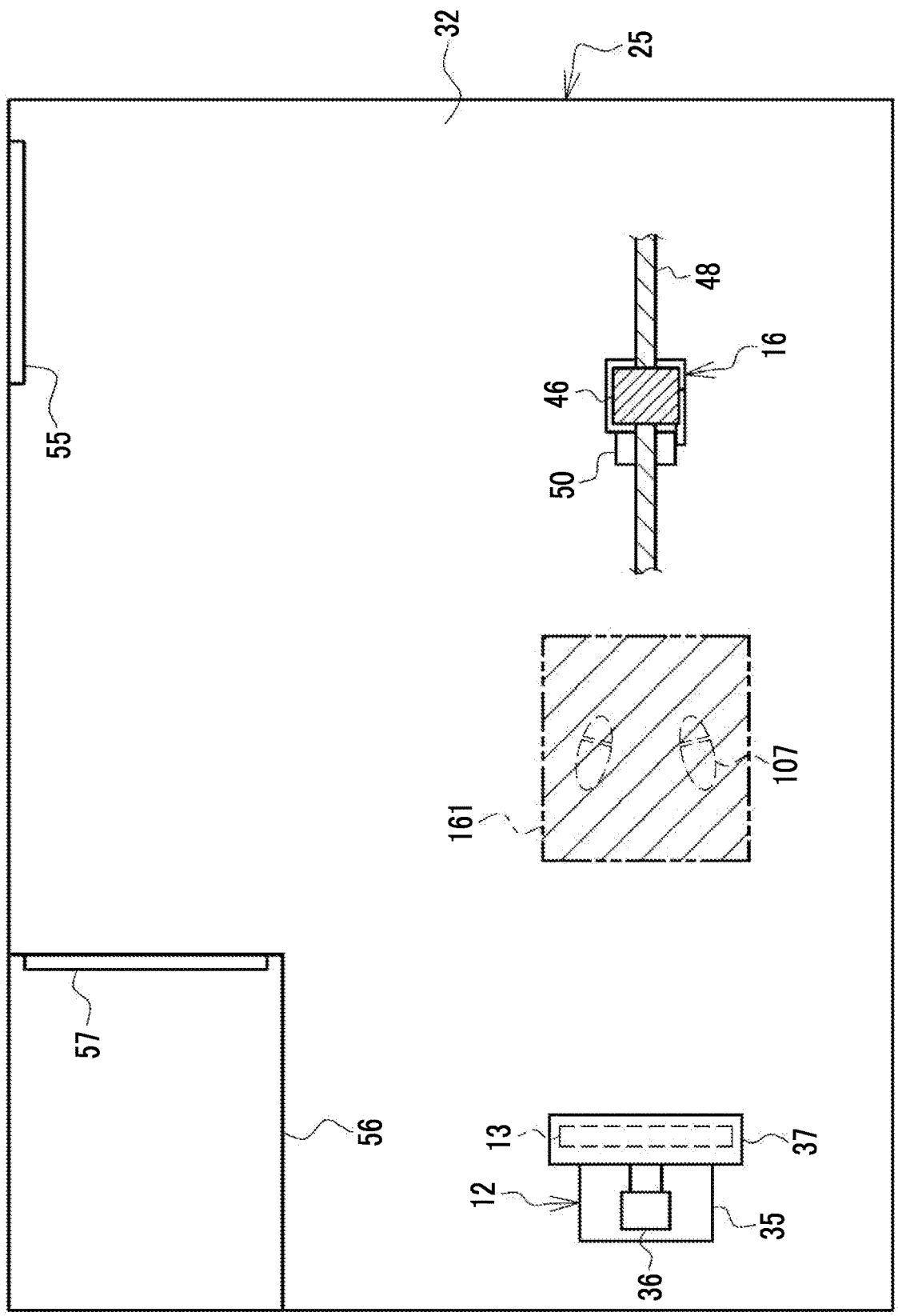
FIG. 25 is a diagram showing normal standing position information.
Figure 26:
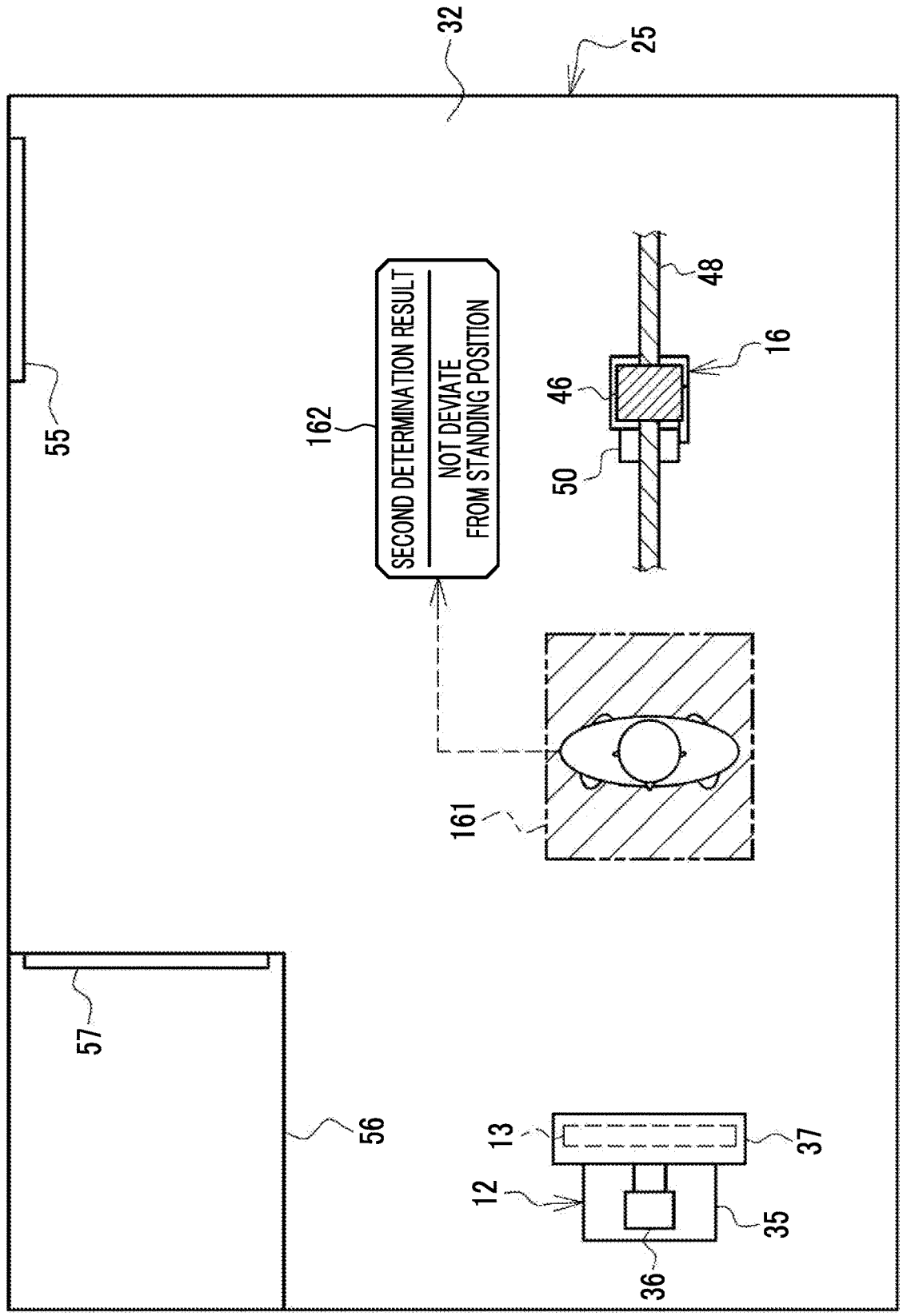
FIG. 26 is a diagram showing a case in which the position of the subject does not deviate from the standing position.
Figure 27:
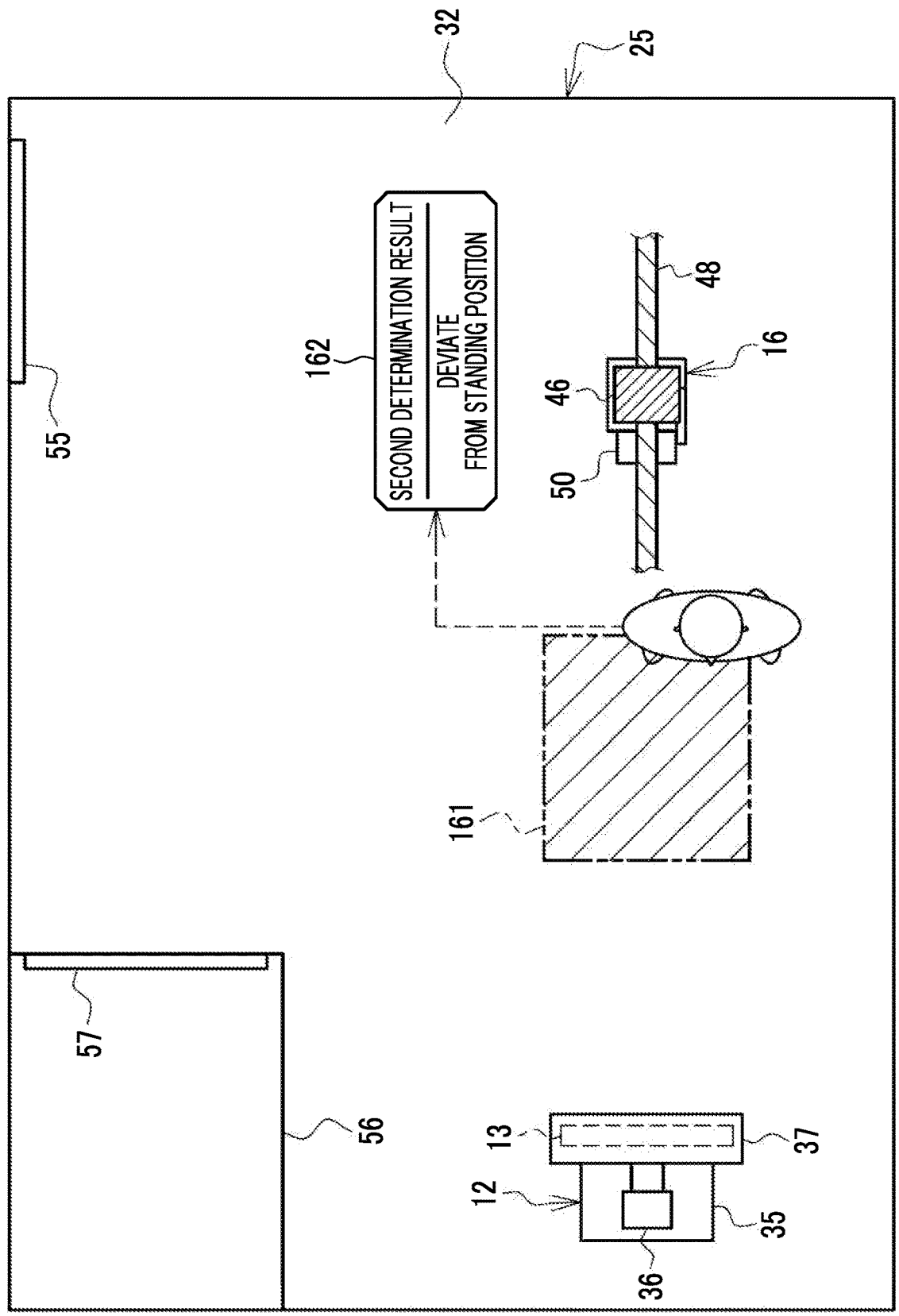
FIG. 27 is a diagram showing a case in which the position of the subject deviates from the standing position.

In FIGS. 25 to 27, the normal standing position information 161 indicating the range of the standing position of the standby position is indicated by a double-dot chain line and hatching. In this case, the normal standing position information 161 indicates a rectangular range in which margins are provided on the front, back, left, and right sides about the foot print 107 that clearly indicates the standby position.

FIG. 26 shows a case in which the position of the subject H indicated by the subject position information 95 is included in the range of the standing position indicated by the normal standing position information 161 and the second determination unit 160 outputs the second determination result 162 indicating a content that the subject H does not deviate from the standing position. In this case, the status recognition unit 93 recognizes that the progress status of the radiography is "standby", and the projection of the second guide information 79B is stopped.

Figure 28:
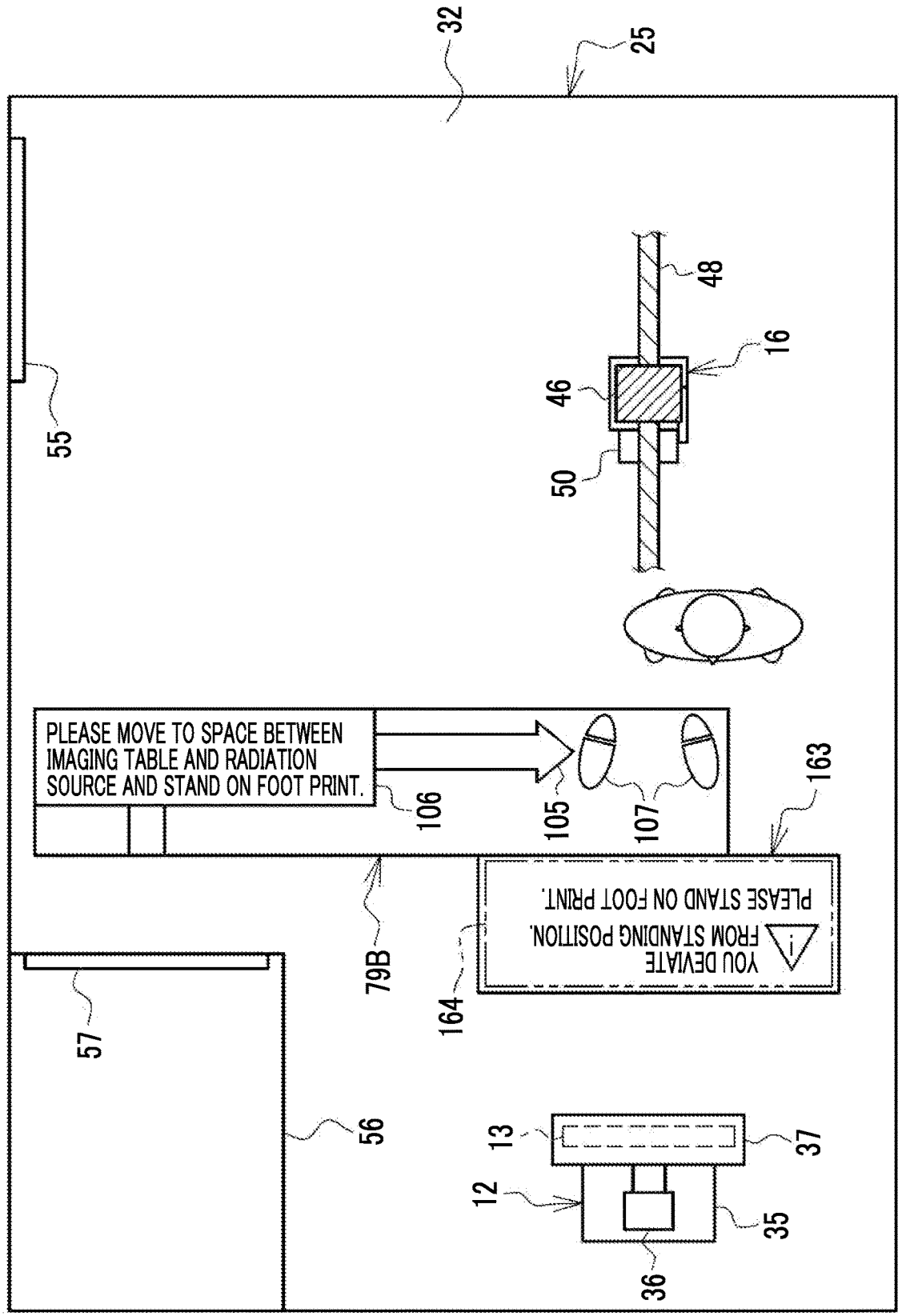
FIG. 28 is a diagram showing second warning information projected onto the floor surface of the radiography room in a case in which the position of the subject deviates from the standing position.

On the other hand, FIG. 27 shows a case in which the position of the subject H indicated by the subject position information 95 is not included in the range of the standing position indicated by the normal standing position information 161 and the second determination unit 160 outputs the second determination result 162 indicating the content that the subject H deviates from the standing position. In this case, as shown in FIG. 28 as an example, the second warning information 163 is projected onto the floor surface 32 of the radiography room 25, in addition to the second guide information 79B. The second warning information 163 is a message 164 consisting of sentences for notifying the subject H that the subject H deviates from the standing position and urging the subject H to stand at the foot print 107. The second warning information 163 is projected onto a portion of the floor surface 32 of the radiography room 25 in front of the upright imaging table 12 by, for example, the third projector 59C. It should be noted that, in addition to the standing position of the standby position shown in FIGS. 25 to 28, the normal standing position information 161 is similarly set for the standing position of the imaging position, and the second warning information 163 is projected onto the floor surface 32 of the radiography room 25 in a case in which the second determination result 162 indicates the content that the subject H deviates from the standing position.

As described above, in the third embodiment, the second determination unit 160 acquires the subject position information 95 indicating the position of the subject H in the radiography room 25. The projector controller 94 outputs the second warning information 163 to the projector 59 in a case in which the position of the subject H indicated by the subject position information 95 deviates from the standing position. Therefore, as compared with a case in which only the guide information 79 is provided, it is possible to strongly urge the subject H to stand in the standing position. In addition, as compared with a case in which only the guide information 79 is provided, it is possible to reliably reduce the mistake that the subject H stands at an unexpected position, such as standing at a position that interferes with the adjustment of the height positions of the radiation source 16 and the holder 37. Further, it is possible to prevent a situation in which the subject H stands outside the imaging position, the radiography is performed in a state in which the upright imaging table 12 and the subject H are separated from each other, and there is no choices other than re-imaging.

Fourth Embodiment

Figure 29:
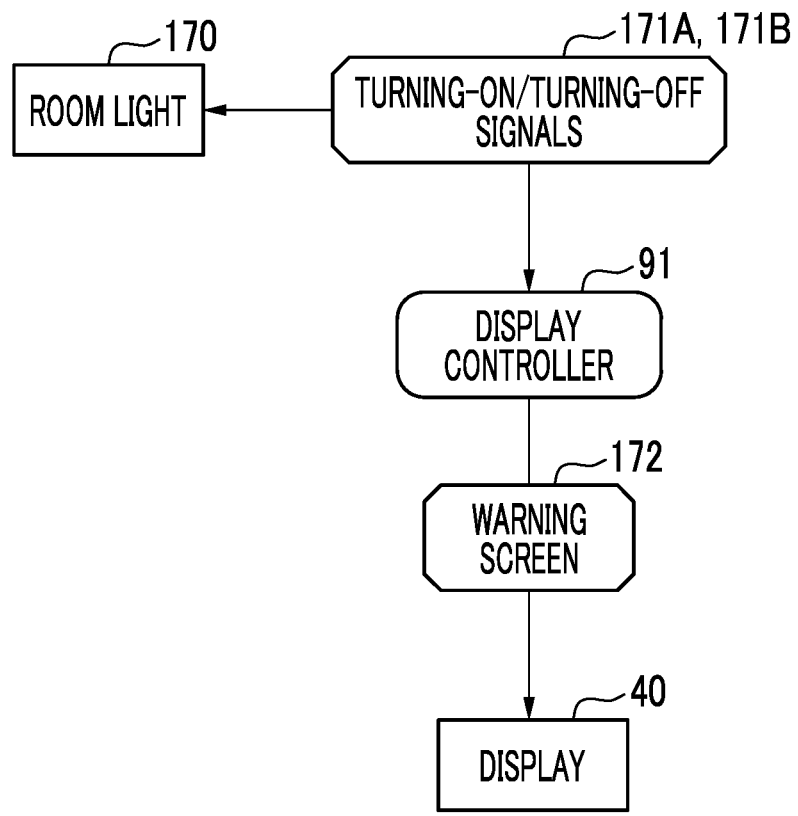
FIG. 29 is a diagram showing a fourth embodiment in which control of setting brightness of the radiography room to be less than a threshold value is performed.

As shown in FIG. 29 as an example, in the fourth embodiment, a turning-on signal 171A and a turning-off signal 171B (referred to as turning-on/turning-off signals in FIG. 29) to the room light 170 of the radiography room 25 are input to the display controller 91.

In a case in which the operator OP confirms the content of the imaging order 71 through the display 40, in other words, in a case in which the turning-on signal 171A is input to the room light 170 and the room light 170 is turned on before the subject H is guided to the radiography room 25 from the waiting room 29, the display controller 91 performs control of displaying a warning screen 172 on the display 40. It should be noted that a case in which the room light 170 is turned on is an example of a "case in which brightness of the imaging room is equal to or larger than a preset threshold value" according to the technology of the present disclosure.

Figure 30:
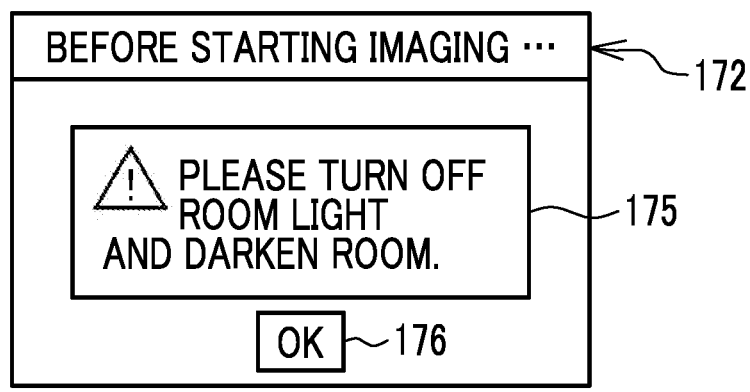
FIG. 30 is a diagram showing a warning screen.

As shown in FIG. 30 as an example, a message 175 is displayed on the warning screen 172 to urge the room light 170 to be turned off to darken the radiography room 25. The display of the warning screen 172 is turned off by selecting an OK button 176. It should be noted that the control of displaying the warning screen 172 on the display 40 is an example of "control of setting the brightness of the imaging room to be less than the threshold value" according to the technology of the present disclosure.

As described above, in the fourth embodiment, the display controller 91 performs control of setting the brightness of the radiography room 25 to be less than the threshold value in a case in which the brightness of the radiography room 25 is equal to or larger than the preset threshold value. Therefore, the brightness of the radiography room 25 can be set to the brightness at which the guide information 79 can be easily visually recognized. Since extra information other than the guide information 79 does not enter a viewing angle, the subject H can be made to gaze the guide information 79.

It should be noted that, in a case in which the room light 170 is turned on before the subject H is guided to the radiography room 25 from the waiting room 29, the room light 170 may be automatically turned off by inputting the turning-off signal 171B to the room light 170. In addition, an illuminometer may be provided on the wall surface of the radiography room 25, and in a case in which the illuminance measured by the illuminometer is equal to or larger than a preset threshold value, a warning screen for urging turning off the room light 170 or closing the curtain may be displayed on the display 40, or the turning-off signal 171B may be input to the room light 170. In a case of a curtain having an automatic open/close function, a signal indicating that the curtain is closed may be input to automatically close the curtain.

In each of the embodiments described above, the DLP type projector 59 has been described, but the present disclosure is not limited to this. A liquid crystal type or liquid crystal on silicon (LCOS) type projector may be used. In addition, a laser projector (line laser projector) may be used for the projection of the foot print 107, the human print 116, or the like. Further, the projector is not limited to the projector. A spotlight may be used to indicate the foot print 107 or the like, or an irradiation field lamp indicating the irradiation field of the radiation R may be diverted to indicate the human print 116 or the like.

A sound indicating the same content as that of the guide information 79 may be output from the speaker 27. In addition, for example, the guide information 79 indicating the movement route to the first door 55 may be projected onto the floor surface of the waiting room 29 or the like.

As a method of detecting the position of the subject H in the radiography room 25, the following method is conceivable in addition to the method by the image analysis of the second optical image 78 according to each of the embodiments described above. That is, a radio wave receiver is installed in the radiography room 25, and a radio wave transmitter is lent to the subject H. Then, the position of the subject H in the radiography room 25 is detected based on the intensity of the radio wave from the radio wave transmitter received by the radio wave receiver. Alternatively, motion sensors may be installed at various places in the radiography room 25, such as the vicinity of the first door 55, the vicinity of the second door 57, and the standby position to detect the position of the subject H in the radiography room 25 based on the on/off of the motion sensor.

An open/close detection sensor may be provided in the first door 55 and the second door 57, and the output of the open/close detection sensor may be input to the status recognition unit 93 as the progress status information. In addition, pressure sensors may be provided in a portion of the foot print 107 in the standby position and a portion of the foot print 112 in the imaging position, and the output of the pressure sensors may be input to the status recognition unit 93 as the progress status information.

The layout of the radiography room 25 shown in FIG. 4 or the like is merely an example. Therefore, in each of the embodiments described above, the example has been described in which the changing room 56 is provided in the radiography room 25, but the present disclosure is not limited to this. The changing room 56 may be provided separately from the radiography room 25. A metal detection gate may be provided in the movement route from the second door 57 of the changing room 56 to the standby position, and it may be detected whether or not the subject H is wearing metal. In addition, the control room 26 does not have to be the room adjacent to the radiography room 25. The control room 26 may be positioned in a building at a remote location different from the medical facility in which the radiography room 25 is positioned.

By performing the image analysis on the first optical image 52, it may be determined whether or not the position and the posture of the subject H are suitable for the radiography. In addition, by providing a camera above the holder 37 of the upright imaging table 12 and performing the image analysis on an optical image captured by the camera, it may be determined whether or not a degree of intimate attachment of the subject H to the holder 37 is suitable for the radiography.

The electronic cassette 13 has been described as an example of the radiation image detector, but the present disclosure is not limited to this. The radiation image detector accommodated in the upright imaging table 12 may be used. In addition, the radiation source 16 may be a type attached to the support column installed to be movable in parallel to the floor surface 32 of the radiography room 25, in addition to the ceiling suspension type suspended from the ceiling 47 of the radiography room 25 by the radiation source suspension device 15.

It is possible to make various modifications with respect to the hardware configuration of the computer constituting the imaging support apparatus according to the present disclosure. For example, the imaging support apparatus can be composed of a plurality of computers separated as hardware in order to improve the processing capacity and the reliability. For example, the functions of the image acquisition unit 90, the display controller 91, and the image analysis unit 92, and the functions of the status recognition unit 93 and the projector controller 94 are distributed to two computers and carried out. In this case, the two computers constitute the imaging support apparatus.

As described above, the hardware configuration of the computer of the imaging support apparatus can be appropriately changed in accordance with required performance, such as processing capacity, safety, and reliability. Further, it is needless to say that, in addition to the hardware, an application program, such as the operation program 85, can be duplicated or distributed and stored in a plurality of storages for the purpose of securing the safety and the reliability.

In each of the embodiments described above, as the hardware structure of the processing units that execute various processing, such as the image acquisition unit 90, the display controller 91, the image analysis unit 92, the status recognition unit 93, the projector controller 94, the first determination unit 150, and the second determination unit 160, the following various processors can be used. As described above, the various processors include, in addition to the CPU 67, which is a general-purpose processor that executes software (operation program 85) to function as the various processing units, a programmable logic device (PLD), which is a processor of which a circuit configuration can be changed after the manufacturing, such as a field programmable gate array (FPGA), a dedicated electric circuit, which is a processor having a circuit configuration designed exclusively for executing specific processing, such as an application specific integrated circuit (ASIC), and the like.

One processing unit may be composed of one of various processors described above or may be composed of a combination of two or more processors (for example, a combination of a plurality of ASICs and/or a combination of an ASIC and a FPGA) of the same type or different types. In addition, a plurality of the processing units may be composed of one processor.

As an example in which the plurality of processing units are composed of one processor, firstly, as represented by a computer, such as a client and a server, there is a form in which one processor is composed of a combination of one or more CPUs and software, and the processor functions as the plurality of processing units. Second, as represented by a system on chip (SoC) or the like, there is a form in which a processor, which realizes the functions of the entire system including the plurality of processing units with a single integrated circuit (IC) chip, is used. As described above, various processing units are composed of one or more of the various processors as the hardware structure.

Further, as the hardware structure of these various processors, more specifically, it is possible to use an electric circuit (circuitry) in which circuit elements, such as semiconductor elements, are combined.

The radiography system 2 has been described as an example of the medical image capturing system, but the present disclosure is not limited to this. The technology of the present disclosure may be applied to a CT imaging system, a magnetic resonance imaging (MRI) imaging system, a single photon emission computed tomography (SPECT) imaging system, a positron emission tomography (PET) imaging system, or the like. In short, any system may be used as long as the system captures a medical image of the subject H in the imaging room.

As a sales form of the technology of the present disclosure, a form is conceivable in which the radiography room 25 in which the upright imaging table 12, the radiation source suspension device 15, the second camera 58, the projector 59, and the like are installed at preset positions and the radiography system 2, such as the console 14, are sold as a set. Alternatively, a form may be adopted in which the second camera 58, the projector 59, and the like are commercial products, and a serviceman is made to perform the attachment and the setting of the projection surface, and only the radiography system 2, such as the console 14, is sold. In addition, a form may be adopted in which the radiography system 2 and the radiography room 25 are existing, the second camera 58, the projector 59, and the like are commercial products, and a serviceman is made to perform attachment and setting of the projection surface, and only the operation program 85 is sold.

The technology of the present disclosure can also be appropriately combined with various embodiments and/or various modification examples described above. In addition, it is needless to say that the present disclosure is not limited to each of the embodiments described above, various configurations can be adopted as long as the configuration does not deviate from the gist. Further, the technology of the present disclosure includes, in addition to the program, a storage medium that stores the program in a non-transitory manner.

The described contents and shown contents above are the detailed description of the parts according to the technology of the present disclosure, and are merely an example of the technology of the present disclosure. For example, the above description of the configuration, the function, the action, and the effect are the description of examples of the configuration, the function, the action, and the effect of the parts according to the technology of the present disclosure. Accordingly, it is needless to say that unnecessary parts may be deleted, new elements may be added, or replacements may be made with respect to the described contents and shown contents above within a range that does not deviate from the gist of the technology of the present disclosure. In addition, in order to avoid complications and facilitate grasping the parts according to the technology of the present disclosure, in the described contents and shown contents above, the description of technical general knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, also in a case in which three or more matters are associated and expressed by "and/or", the same concept as "A and/or B" is applied.

All documents, patent applications, and technical standards described in the present specification are incorporated herein by reference to the same extent as in a case in which each document, each patent application, and each technical standard are specifically and individually described by being incorporated by reference.

What is claimed is:

1. An imaging support apparatus used in a medical image capturing system that performs imaging of a medical image of a subject in an imaging room, the apparatus comprising:
 a processor,
 wherein the processor
  acquires progress status information indicating a progress status of the imaging, and
  performs control of causing a projector to project guide information which is related to the imaging aimed at the subject, the guide information corresponding to the progress status information, onto a preset projection surface of the imaging room,
 wherein the guide information includes at least one of:
  information indicating a movement route of the subject in the imaging room, or
  information indicating a standing position of the subject in the imaging room, the preset projection surface being a floor surface of the imaging room.

2. The imaging support apparatus according to claim 1, wherein the processor
 acquires subject position information indicating a position of the subject in the imaging room, and
 outputs a warning in a case in which the position of the subject indicated by the subject position information deviates from the movement route.

3. The imaging support apparatus according to claim 1, wherein the processor
 acquires subject position information indicating a position of the subject in the imaging room, and
 outputs a warning in a case in which the position of the subject indicated by the subject position information deviates from the standing position.

4. The imaging support apparatus according to claim 1, wherein the guide information includes information indicating at least any one of a position or a posture of the subject with respect to an imaging table on which the subject is positioned for the imaging, and
the projection surface is the imaging table, a wall surface of the imaging room around the imaging table, or a ceiling of the imaging room above the imaging table.

5. The imaging support apparatus according to claim 1, wherein, in a case in which brightness of the imaging room is equal to or larger than a preset threshold value, the processor performs control of setting the brightness of the imaging room to be less than the threshold value.

6. The imaging support apparatus according to claim 1, wherein the medical image capturing system is a radiography system.

7. An operation method of an imaging support apparatus used in a medical image capturing system that performs imaging of a medical image of a subject in an imaging room, the method comprising:
 acquiring progress status information indicating a progress status of the imaging; and
 performing control of causing a projector to project guide information which is related to the imaging aimed at the subject, the guide information corresponding to the progress status information, onto a preset projection surface of the imaging room,
 wherein the guide information includes at least one of:
  information indicating a movement route of the subject in the imaging room, or
  information indicating a standing position of the subject in the imaging room, the preset projection surface being a floor surface of the imaging room.

8. A non-transitory computer-readable storage medium storing an operation program of an imaging support apparatus used in a medical image capturing system that performs imaging of a medical image of a subject in an imaging room, the program causing a computer to execute a process comprising:
 acquiring progress status information indicating a progress status of the imaging; and
 performing control of causing a projector to project guide information which is related to the imaging aimed at the subject, the guide information corresponding to the progress status information, onto a preset projection surface of the imaging room,
 wherein the guide information includes at least one of:
  information indicating a movement route of the subject in the imaging room, or
  information indicating a standing position of the subject in the imaging room, the preset projection surface being a floor surface of the imaging room.

* * * * *